US012724451B2

(12) United States Patent
Wickersham

(10) Patent No.: US 12,724,451 B2
(45) Date of Patent: Sep. 1, 2026

(54) INTERCHANGEABLE STRUCTURAL CONFIGURATION SYSTEMS AND METHODS

(71) Applicant: James Wickersham, Healdsburg, CA (US)

(72) Inventor: James Wickersham, Healdsburg, CA (US)

(*) Notice: Subject to any disclaimer, the term of this patent is extended or adjusted under 35 U.S.C. 154(b) by 397 days.

(21) Appl. No.: 18/216,334

(22) Filed: Jun. 29, 2023

(65) Prior Publication Data

US 2024/0004424 A1 Jan. 4, 2024

Related U.S. Application Data

(60) Provisional application No. 63/356,650, filed on Jun. 29, 2022.

(51) Int. Cl.
*G06F 1/16* (2006.01)
*B33Y 50/00* (2015.01)
*B33Y 80/00* (2015.01)

(52) U.S. Cl.
CPC ............ *G06F 1/1615* (2013.01); *B33Y 50/00* (2014.12); *B33Y 80/00* (2014.12)

(58) Field of Classification Search
CPC ..... G06F 1/1615; G06F 1/1622; B33Y 50/00; B33Y 80/00; H02G 15/013; H02G 15/113
See application file for complete search history.

(56) References Cited

U.S. PATENT DOCUMENTS

| | | | | |
|---|---|---|---|---|
| 6,881,901 B2 * | 4/2005 | Egan | H02G 15/013 | 174/665 |
| 7,997,944 B1 * | 8/2011 | Federowicz | H01R 4/66 | 439/814 |
| 8,210,210 B2 * | 7/2012 | Clark | F16L 55/179 | 285/15 |
| 8,240,167 B2 * | 8/2012 | Ingram | F16L 55/103 | 62/259.4 |
| 8,272,670 B2 * | 9/2012 | Krug, Jr. | F16L 59/024 | 285/45 |
| 9,353,901 B2 * | 5/2016 | Dickinson | F16L 55/1715 | |
| 11,339,910 B1 * | 5/2022 | Brown | F16L 58/181 | |
| 11,411,378 B2 * | 8/2022 | Schnieder | H02G 3/0675 | |
| 11,933,446 B2 * | 3/2024 | Garcia | F16L 55/168 | |
| 2003/0075035 A1 * | 4/2003 | Ross | G10D 7/063 | 84/380 B |

(Continued)

*Primary Examiner* — Chi Q Nguyen

(74) *Attorney, Agent, or Firm* — Polsinelli LLP

(57) ABSTRACT

Systems and techniques are provided for interchangeable structural configuration. In some examples, a system includes a plurality of housing elements with respective exteriors that share at least one shape attribute. Each of the plurality of housing elements detachably houses a respective portion of a structure to apply the at least one shape attribute to the respective portion of the structure. The plurality of housing elements includes a plurality of interlocking components that secure the plurality of housing elements about the structure (e.g., securing the plurality of interlocking components to the structure and/or to other interlocking component(s)). The system includes a plurality of fasteners arranged along the plurality of interlocking components. The plurality of fasteners detachably secure the plurality of interlocking components (e.g. to the structure and/or to other interlocking component(s)).

18 Claims, 11 Drawing Sheets

(56) References Cited

U.S. PATENT DOCUMENTS

| | | | | |
|---|---|---|---|---|
| 2018/0266598 | A1* | 9/2018 | Kim | F16L 19/103 |
| 2018/0317682 | A1* | 11/2018 | Nguyen | B65D 23/14 |
| 2024/0088599 | A1* | 3/2024 | Tay | H02G 15/117 |

* cited by examiner

INTERCHANGEABLE STRUCTURAL CONFIGURATION SYSTEMS AND METHODS

CROSS-REFERENCE TO RELATED APPLICATIONS

The present application claims the priority benefit of U.S. provisional application No. 63/356,650 filed Jun. 29, 2022 and entitled "Interchangeable Furniture Apparatus and Systems and Methods Related Thereto," the disclosure of which is hereby incorporated by reference in its entirety.

BACKGROUND

1. Field

The present technology generally pertains to customization of structures using customized interchangeable and removable housing elements. More specifically, the technology pertains to manufacturing processes such as casting, tools, and parts that effectuate customizable and interchangeable effects, inclusive of software solutions for artists, creators, manufacturers, sellers, and consumers to implement and enjoy the benefits of the disclosed interchangeable apparatus. The structures may include articles of furniture or other structures. Solutions can include digital libraries, marketplaces, and verification and authentication tools including blockchain and non-fungible tokens.

2. Description of the Related Art

Traditional furniture and similar structures can have permanent shape attributes that cannot be changed to match changes to trends, personal preferences, or any other basis for customization. The result is regular replacement and disposal of furniture and like apparatus. Replacement frequency has a significant environmental impact resulting from packaging, shipping, and landfill waste. More than 12 million tons of furniture and appliances find their way to U.S. landfills annually.

High-quality furniture maintains structural integrity longer than consumer trends. These trends nevertheless persist and invoke a demand for cheaper, readily disposable furniture. Portions of furniture and other apparatus may be individually desirable or have longer term value that outlasts shorter term trends for a larger design thus suggesting retention or maintenance. That these parts or portions are permanently or otherwise integrated with structural members of the furniture or apparatus or other joinery nevertheless results in disposal or destruction of the entirety of the furniture given design changes or tends.

Further compounding these problems is the existence of easy assembly, low-cost furniture. This furniture cannot support traditional freight cost and is instead made for flat-pack ground shipping. The lower quality of such furniture correlates to lower cost. The lower quality affects structural integrity of joinery and the furniture or apparatus. The useful life of such furniture despite trends or style is significantly and negatively affected.

SUMMARY

Systems and techniques are provided for interchangeable structural configuration. In some examples, a system includes a plurality of housing elements with respective exteriors that share at least one shape attribute. Each of the plurality of housing elements detachably houses a respective portion of a structure to apply at least one shape attribute to the respective portion of the structure. The plurality of housing elements includes a plurality of interlocking components that secure the plurality of housing elements about the structure (e.g., securing the plurality of interlocking components to the structure and/or to other interlocking component(s)). The system includes a plurality of fasteners arranged along the plurality of interlocking components. The plurality of fasteners detachably secure the plurality of interlocking components (e.g. to the structure and/or to other interlocking component(s)).

In some examples, a system is provided to identify a structure. The system can customize respective interiors of a plurality of housing elements based on the structure to customize a design of the plurality of housing elements based on the structure. The plurality of housing elements have respective exteriors that share at least one shape attribute. Each of the plurality of housing elements detachably houses a respective portion of the structure to apply at least one shape attribute to the respective portion of the structure of a plurality of portions of the structure. The plurality of housing elements includes a plurality of interlocking components that secure the plurality of housing elements about the structure. A plurality of fasteners are arranged along the plurality of interlocking components and detachably secure the plurality of interlocking components. The system can output the design of the plurality of housing elements, the design customized based on the structure.

DETAILED DESCRIPTION

Figure 1:
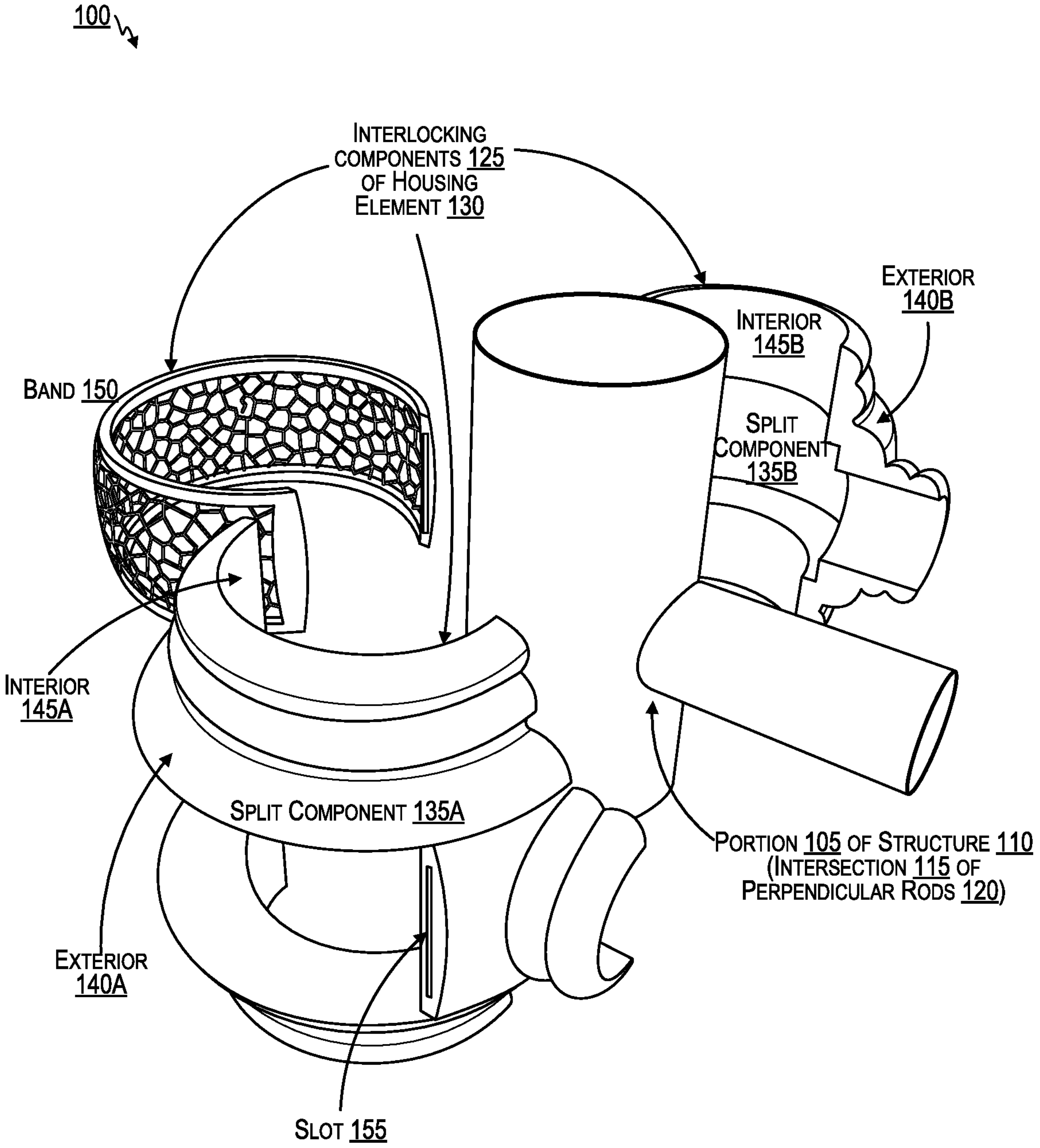
FIG. 1 is an exploded perspective diagram illustrating an interchangeable structural configuration system with a housing element with interlocking components that include two split components and a band, and having a design to apply to a portion of a structure, in accordance with some examples.

Consumers and artists as well as developers of software and associated machinery (e.g., three-dimensional printing) are capable and desirous of designing aesthetically pleasing furniture and related apparatus. Consumers and artists need assistance in assuring structural and engineering integrity. There is a further need for customizable furniture and related apparatus that is inexpensive without being mass-produced. There is a further need for the consolidation of this design expertise, structural engineering, and craftsmanship without corresponding production lead times, unnecessary permanence, lack of interchangeability and related environmental cost both with respect to disposal and transport. There is a still further demand for related services such as cataloging, collection, tracking, provenance, and exchange relative modern software, mobile, and online environments.

Certain aspects of this disclosure are provided below. It is to be understood that some of these aspects may be applied independently and some of them may be applied in combination as would be apparent to those of skilled in the art. The following description explains specific details in order to provide a thorough understanding of aspects of the application. However, it should also be understood that various aspects may be practiced without these specific details. The figures and description are not intended to be restrictive.

The following description provides example aspects only, and is not intended to limit the scope, applicability, or configuration of the disclosure but will provide those skilled in the art with an enabling description for implementing an example aspect. It should be understood that various changes may be made in the function and arrangement of elements without departing from the spirit and scope of the application as set forth in the appended claims.

Systems and techniques are provided for interchangeable structural configuration. In some examples, a system includes a plurality of housing elements with respective exteriors that share at least one shape attribute. Each of the plurality of housing elements detachably houses a respective portion of a structure to apply the at least one shape attribute to the respective portion of the structure. The plurality of housing elements includes a plurality of interlocking components that secure the plurality of housing elements about the structure (e.g., securing the plurality of interlocking components to the structure and/or to other interlocking component(s)). The system includes a plurality of fasteners arranged along the plurality of interlocking components. The plurality of fasteners detachably secure the plurality of interlocking components (e.g. to the structure and/or to other interlocking component(s)).

In some examples, the system includes a structure. The system includes at least one housing element, in some examples including a plurality of housing elements. Each housing element is a component that is configured to, and can, house at least one portion of the structure. The housing elements include one or more interlocking components (e.g., that may interlock with one another and/or with the structure) and/or one or more fasteners (e.g., that may fasten the interlocking components to one another and/or to the structure). In some examples, multiple sets of housing elements can be designed for a given structure. Each set of housing elements can include one or more housing elements that share at least one shape attribute (e.g., curvature, design, outline, edges, style, type, overall aesthetic, ornamentation, pattern, mesh) and/or a set of one or more materials, so that the set of housing elements matches and applies the at least one shape attribute to the various portions of the structure that the set of housing elements is applied to, to house those portions of the structure. Thus, by applying the set of housing elements to the various portions of the structure to house those portions of the structure, the set of housing elements can apply a consistent style across the structure. Different sets of housing elements can be interchangeable and can be distinct from one another. For instance, a first set of housing elements can share a first shape attribute (e.g., a vintage or antique style and shape with angular edges) and a first set of materials (e.g., cast iron and wood), but can differ from a second set of housing elements that can instead share a second shape attribute (e.g., a modern and sleek style with curved edges) and a second set of materials (e.g., aluminum and plastic).

Embodiments of the present disclosure as specifically defined by the claims may provide for furniture and similar apparatus with customizable and interchangeable housing element components. Structural members, joinery, or other componentry of such furniture and apparatus may be engineered for safety and structural integrity while allowing for low-cost production with quality equipment and skilled craftsman as well as individual artists and designers. These interchangeable components may be integrated with attachments or in some instances constitute the attachment themselves to releasably fasten, affix, or couple requisite other parts, components, and joinery. A variety of different types of componentry are disclosed and discussed herein. Other embodiments of the technology may involve software, templates, and specifications for creating integrative structural members and joinery and printable ornament designs like those described herein. A platform for buying and selling housing element licensing and production services, including three-dimensional printing, is also within the scope of various embodiments. This could be inclusive of both proprietary or open platforms or plugins and may use application programming interfaces (APIs) that can integrate with other pre-existing software solutions, including apparatus such as mobile devices, virtual reality, and traditional desktop/laptop/notebook solutions. Both internally local and software-as-a-service (SaaS) implementations as well as combination of the foregoing may be used. Means and methodology for digital tracking may also be utilized including those involving non-fungible tokens or other implementations involving the blockchain.

FIG. 1 is an exploded perspective diagram illustrating an interchangeable structural configuration system 100 with a housing element 130 with interlocking components 125 that include two split components 135A-135B and a band 150, and having an exemplary design to apply to a portion 105 of a structure 110. The portion 105 of the structure 110 includes an intersection 115 of perpendicular rods 120 (e.g., perpendicular tubes), for instance including a thicker first rod or tube intersected with and thinner second rod or tube in a "T" intersection, with the second rod or tube being perpendicular to the first rod or tube. In some examples, the structure 110 as a whole may be and/or may include, at least a part of any of: an article of furniture, such as a bed, a bed frame, a chair, a couch, a loveseat, a table, a bookcase, a shelving unit, a stool, a desk, a bench, a nightstand, a lounge, a cupboard, a cabinet, a drawer, a chest, a console, a credenza, dresser, a recliner, a lounge, another article of furniture discussed herein, or a combination thereof. The portion 105 of the structure 110 may include a structural support for the structure 110. In some examples, the portion 105 of the structure 110 can include, for instance, a furniture leg, a supporting crossbar, a joint, joinery, a crossbar, a furniture part such as a headboard for a bed, a frame of a chair, or a combination thereof. In some examples, the structure 110 may be, and/or may include, at least a part of any of: an article of furniture, a vehicle, a house, a building, a tent, a lamp, a frame, a bridge, an article of clothing, a statue, a model, a door, a gate, an accessory, a computing system, a device, or a combination thereof.

In some examples, the structure 110 (including the portion 105 and/or one or more additional portions of the structure 110) can be manufactured using at least one of a variety of techniques. In some examples, the structure 110 (including the portion 105 and/or one or more additional portions of the structure 110) may include, and/or be manufactured from, steel, cast iron, wrought iron, iron, anodized aluminum, aluminum, wood, carbon fiber, an epoxy granite composite, plastic, thermoplastic, ceramic, glass, nickel, brass, bronze, copper, gold, silver, magnesium, lead (e.g., with safety precautions), stone, cement, marble, another material or composite discussed herein, a composite of any of the materials discussed herein, or a combination thereof. While the portion 105 of the structure 110 is illustrated as including a "T" intersection 115 of perpendicular rods 120 or tubes, the structure 110 may include other portions that include four-way "+"-shaped intersections of rods or tubes, "Y" shaped intersections of rods 120 or tubes, right angle intersections of rods or tubes, another rigid joint or form of j oinery, straight sections of rods or tubes (e.g., columns or pillars or horizontal bars or diagonal bars), curved sections of rods or tubes, corners, edges, mobile joints, hinges, levers, planes, ball and socket joints, or combinations thereof.

The housing element 130 interacts with the portion 105 of the structure 110 to house, surround, cover, and/or fit around the portion 105 of the structure 110. The housing element 130 includes three interlocking components 125 that secure to one another and/or to the portion 105 of the structure 110 itself to house, surround, cover, and/or fit around the portion 105 of the structure 110. The interlocking components 125 include a split component 135A, a split component 135B, and a band 150. The split component 135A and the split component 135B mirror one another. The exterior 140A of the split component 135A and the exterior 140B of the split component 135B share shape attributes, including a shared shape, curvature, curve radius, pattern, outline, layout, design, ornamentation, pattern, mesh, an arrangement of edges and/or corners and/or curves or any of the previously listed elements, or a combination thereof. Because of the shared shape attributes between the exterior 140A of the split component 135A and the exterior 140B of the split component 135B, curves and edges along the split component 135A and the split component 135B join together to form unbroken curves and edges once the split component 135A and the split component 135B interlock together, for instance to one another and/or to the portion 105 of the structure 110 itself. An interior 145A of the split component 135A and an interior 145B of the split component 135B are customized to fit around the portion 105 of the structure 110 (e.g., to fit snugly around the portion 105 of the structure 110). For instance, the respective shapes of the interior 145A of the split component 135A and the interior 145B of the split component 135B can be customized to match a shape of the exterior of the portion 105 of the structure 110, so that the interior 145A of the split component 135A and the interior 145B of the split component 135B can be positioned adjacent to the exterior of the portion 105 of the structure 110 and have curves and edges of the exterior of the portion 105 of the structure 110 align to corresponding curves and edges of the interiors 145A-145B of the split components 135A-135B.

The band 150 of the interlocking components 125 also includes one or more shape attributes that the band 150 may share in common with the split components 135A-135B, such as the shape, curvature, curve radius, pattern, outline, layout, design, and/or arrangement of edges and corners and curves. The band 150 also includes some shape attributes of its own, including a mesh pattern design. The mesh pattern design is illustrated in FIG. 1 as a Voronoi pattern, but in other examples, can include a different mesh pattern, such as a striped pattern, a checkerboard pattern, a grid or lattice pattern, or a combination thereof. In some examples, at least one of the interlocking components 125 can be rigid, with an interior (e.g., interiors 145A-145B) that are molded or shaped to fit around the portion 105 of the structure 110. In some examples, at least one of the interlocking components 125 can be flexible, with an interior (e.g., interiors 145A-145B) that is arranged to flex around the portion 105 of the structure 110. For instance, in an illustrative example, the band 150 may be at least partially flexible and formed in a "C" shape, with enough flexibility to expand the gap in the "C" shape to accept the thicker rod or tube of the perpendicular rods 120 of the portion 105 of the structure 110 into the opening of the "C" shape, allowing the band 150 to wrap around the thicker rod or tube of the perpendicular rods 120 of the portion 105 of the structure 110. In some examples, each end of the band 150 may slide or clip into slots or grooves in the other interlocking components of the interlocking components 125, such as the slot 155 illustrated in the split component 135A. The split component 135B may also include a corresponding slot (not pictured) that is similar to the slot 155, positioned at the corresponding mirrored position in the split component 135B. In this way, the band 150 can secure the housing element 130 to the portion 105 of the structure 110 by wrapping around the thicker rod or tube of the perpendicular rods 120 of the portion 105, and can also secure to the split component 135A by sliding into the slot 155 and to the split component 135B by sliding into a corresponding slot. Thus, the housing element 130 can be secured in place based on the interlocking components 125 securing to one another, based on the interlocking components 125 securing themselves to or around portion 105 of the structure 110, or a combination thereof. The housing element 130, when secured, can be releasably coupled, affixed, adjoining, interacting, adjacent, or present relative to the portion 105 of the structure 110. The band 150 may be referred to as a cuff or a bracelet.

In some examples, at least a portion of the housing element 130 is rigid (e.g., at least a portion of at least one of the interlocking components 125 is rigid). For instance, in an illustrative example, the housing element 130 includes at least one rigid material having an interior surface (e.g., interiors 145A-145B and/or the interior of the band 150) shaped according to the portion 105 of the structure 110, for instance to align with, follow along with, and/or match a curvature, outline, shape, and/or edge of a surface of one or more surfaces of the portion 105 of the structure 110 (e.g., of the perpendicular rods 120). In an illustrative example, the housing element 130 includes at least one flexible material having a surface (e.g., the interior surface and/or exterior surface of the band 150) configured to flex around the portion 105 of the structure 110 to align with, follow along with, and/or match a curvature, outline, shape, and/or edge of a surface of one or more surfaces of the portion 105 of the structure 110 (e.g., of the perpendicular rods 120). The housing element 130 and/or the interlocking components 135 can be referred to as ornamental part(s), ornamental component(s), ornamental element(s), ornamental connector(s), design part(s), design component(s), design element(s), design connector(s), structural configuration part(s), structural configuration component(s), structural configuration element(s), structural configuration connector(s), structural customization part(s), structural customization component(s), structural customization element(s), structural customization connector(s), customization part(s), customization component(s), customization element(s), customization connector(s), releasable part(s), releasable component(s), releasable element(s), releasable connector(s), detachable part(s), detachable component(s), detachable element(s), detachable connector(s), removable part(s), removable component(s), removable element(s), removable connector(s), or a combination thereof.

In some examples, at least one of the interlocking components 125 of the housing element 130 includes a concave interior surface that is configured to wrap around, align with, cup, cover, and/or match a curvature of a convex surface of the portion 105 of the structure 110. The housing element 130 as a whole includes an interior surface formed from the respective interior surfaces of the interlocking components 125 that combine together once the interlocking components 125 are secured in place (e.g., to each other and/or to the structure 110) around the portion 105 of the structure 110. In some examples, the interior surface of the housing element 130 defines an opening configured to receive the corresponding portion 105 of the structure 110. The housing element 130 is arranged onto and/or around the portion 105 structure 110, for instance by having the inner surface of the housing element 130 physically contact at least the respective portion 105 of the structure 110, such as the intersection 115 illustrated in FIG. 1. Because the housing element 130 is removably secured about the portion 105 of the structure 110, the housing element 130 may be removed, replaced, and/or interchanged with another housing element from a same set as the housing element 130 (e.g., sharing a set of one or more shape attributes and/or set of one or more material(s)) or from a different set of housing elements (e.g., the different set sharing a different set of one or more shape attributes and/or a different set of one or more material(s)) according to a desired style to apply to the structure 110 to customize the structure 110.

In some examples, housing element 130 is designed to detachably house, removably house, detachably secure to, removably secure to, detachably couple to, removably couple to, detachably connect to, removably connect to, the portion 105 of the structure 110, for instance using one or more fasteners. One example of such a fastener in FIG. 1 includes the flexible "C" shape of the band 150. In some examples, at least a first interlocking component of the interlocking components 125 of the housing element 130 are designed to detachably secure to, removably secure to, detachably couple to, removably couple to, detachably connect to, removably connect to, at least a second interlocking component of the interlocking components 125, for instance using one or more fasteners. One example of such a fastener is the protrusion (e.g., a tab) at the proximal end of the band 150 that fits into the slot 155 in the split component 135A, and the corresponding the protrusion (e.g., tab) at the distal end of the band 150 that fits into the corresponding slot in the split component 135B. In some examples, fasteners that secure the housing element 130 in place (e.g., that secure the housing element 130 to the structure and/or that secure the interlocking components 125 to each other) can include screws received by threaded screw holes, nails received by nail holes, posts received by post holes, protrusions or tabs received by holes or slots, magnets that attract to and magnetically couple to other magnets or ferromagnetic materials (e.g., ferromagnetic metals), adhesives, hook-and-loop fasteners, bolts or nuts receives onto threaded posts or shanks, keys received by key-ways, washers, anchors, rivets, studs, inserts, hinges, clasps, latches, grommets, gaskets, retaining rings, pins, Clevis pins, Clotter pins, suction cups, buttons (e.g., clothing buttons), buckles, snaps, zippers, hooks, toggles, links, chains, rubber bands, hook and eye fasteners, frog fasteners, cords ropes (e.g., to be tied or untied or secure or loosen), sliders, clasps, interlocking mechanism(s), any other fasteners discussed herein, or combinations thereof. In the example of the band 150 as a fastener for the housing element 130 of FIG. 1, the shape of the band forms a C-shaped cuff having a pair of resilient arms biased toward each other that are configured to secure the interlocking components according to a tension force.

In some examples, the split component 135A fastens or couples to the split component 135B using one or more latches, magnets, or other fasteners along the interior 145A and/or the interior 145B. For instance, in one example, one or more latches, magnets, or fasteners along the interior 145A interact with and/or couple to one or more latches, magnets, or fasteners along the interior 145B to secure the split component 135A to the split component 135B. In some examples, at least one of the split components 135A-134B fastens or couples to the portion 105 of the structure 110 using one or more latches, magnets, or other fasteners along the interior 145A and/or the interior 145B and/or a surface of the portion 105 of the structure 110. For instance, in one example, one or more latches, magnets, or other fasteners along the at least one of the interiors 145A-145B interacts with and/or couples to one or more latches, magnets, and/or other fasteners along a surface of the portion 105 of the structure 110 to couple the housing element 130 to the portion 105 of the structure 110.

The housing element 130 includes at least three interlocking components 125, for instance with the split component 135A being the first interlocking component, he split component 135B being the second interlocking component, and the band 150 being the third interlocking component. In some examples, the housing element 130 (and/or at least one interlocking component thereof) can wrap around an entirety of a circumference of the portion 105 of the structure 110 (e.g., the entirety of the circumference of the intersection 115 and/or of at least one of the perpendicular rods 120). In some examples, the housing element 130, the interlocking components 125 (e.g., the split components 135A-135B and/or the band 150), and/or any associated fasteners can include, and/or be manufactured from, any of: steel, cast iron, wrought iron, iron, anodized aluminum, aluminum, wood, carbon fiber, an epoxy granite composite, plastic, thermoplastic, ceramic, glass, nickel, brass, bronze, copper, gold, silver, magnesium, lead (e.g., with safety precautions), stone, cement, marble, another material or composite discussed herein, a composite of any of the materials discussed herein, or a combination thereof. In some examples, the housing element 130, the interlocking components 125 (e.g., the split components 135A-135B and/or the band 150), and/or any associated fasteners can include at least one three-dimensionally (3D) printed component that includes at least one of a metal, a plastic, a thermoplastic, or a resin. In some examples, the housing element 130, the interlocking components 125 (e.g., the split components 135A-135B and/or the band 150), and/or any associated fasteners can be manufactured using one or more systems and/or techniques, including at least one of 3D printing and/or additive manufacturing using a 3D printer, a computer numerical control (CNC) routing using a CNC router, casting in a cast iron foundry, welding, hand forging, hand carving, injection molding, sand casting, die casting, cutting with a water jet cutter, cutting with a laser cutter, cutting with a saw, routing with a router, drilling with a drill, sanding with a sander, grinding with a die grinder or Dremel, honing, polishing, engraving, burning, melting, shaping, cutting, hammering, or a combination thereof.

In some examples, the structure 110 may form a "skeleton" of an object, such as an article of furniture or a vehicle or building or other type of object discussed herein. Housing elements from a set of housing elements, for instance including the housing element 130, can be applied to different portions of the structure 110 to apply a specific style (e.g., associated with one or more shape attributes shared by the set of housing elements and/or one or more materials shared by the set of housing elements) to the structure 110. Different sets of housing elements can be interchangeable and can be distinct from one another. A user who wishes to change a style of an object can, rather than replacing the whole object, instead replace the set of housing elements applied to house portions of the structure with a different set of housing elements, and in so doing, also replace the associated style with a different style. For instance, a first set of housing elements can share a first shape attribute (e.g., a vintage or antique style and shape with angular edges) and a first set of materials (e.g., cast iron and wood), and can differ from a second set of housing elements that can instead share a second shape attribute (e.g., a modern and sleek style with curved edges) and a second set of materials (e.g., aluminum and plastic). A user who wishes to change a style of an object (e.g., a bed frame) can remove the housing elements that belong to the first set of housing elements from the structure of the bed frame, and secure housing elements that belong to the second set of housing elements to the structure of the bed frame in their stead.

In some examples, the intersection 115 is a rigid intersection in which the perpendicular rods 120 are rigidly secured to one another so as to be immobile relative to one another. In some examples, the perpendicular rods 120 are rigid. In some examples, at least one of the interlocking components 125 is rigid. In some examples, an intersection of two or more of the interlocking components 125 is rigid, so that the two or more of the interlocking components 125 are immobile relative to one another (e.g., except to detach via the fastener(s) or interlocking mechanism(s)). In some examples, the housing element 130 is rigid.

In some examples, the intersection 115 is a flexible intersection in which the perpendicular rods 120 are flexibly secured to one another so as to have a range of flexibility and/or movement relative to one another. In some examples, the perpendicular rods 120 are flexible. In some examples, at least one of the interlocking components 125 is flexible. In some examples, an intersection of two or more of the interlocking components 125 is flexible, so that the two or more of the interlocking components 125 have a range of flexibility and/or movement relative to one another (e.g., in addition to being able to detach via the fastener(s) or interlocking mechanism(s)). In some examples, the housing element 130 is flexible.

In some examples, the intersection 115 includes a joint (e.g., a movable joint) that can move, slide, expand, contract, rotate, pivot, skew and/or other allow the intersected elements (e.g., the perpendicular rods 120) to move relative to one another (e.g., within a predetermined range of movement). In some examples, at least one of the perpendicular rods 120 themselves include a joint (e.g., a movable joint), for instance allowing one portion of a rod to move relative to another (e.g., within a predetermined range of movement). To accommodate such movement, and/or to accommodate flexibility in the structure 110, in some examples, the housing element 130 can include a joint (e.g., a movable joint) that can move, slide, expand, contract, rotate, pivot, skew and/or other allow the interlocking components 125 (e.g., and/or other member(s) of the housing element 130) to move relative to one another (e.g., within a predetermined range of movement). In situations where the portion 105 of the structure 110 includes a movable joint, using a housing element 130 that includes a corresponding movable joint can allow the structure 110 to preserve the range of movement offered by the movable joint of the structure 110, based on the corresponding range of movement offered by the movable joint of the housing element 130. In some examples, the housing element 130 can include multiple joints (e.g., one or more movable joints and/or one or more rigid joints). Similarly, in some examples, the structure 110, or even the portion 105 of the structure 110, can include multiple joints (e.g., one or more movable joints and/or one or more rigid joints). Each of the movable joints discussed above can include, for instance, a hinge, a pivot, a ball and socket joint, a lever, a revolute joint, a pin joint, a spherical joint, or a combination thereof.

Figure 2:
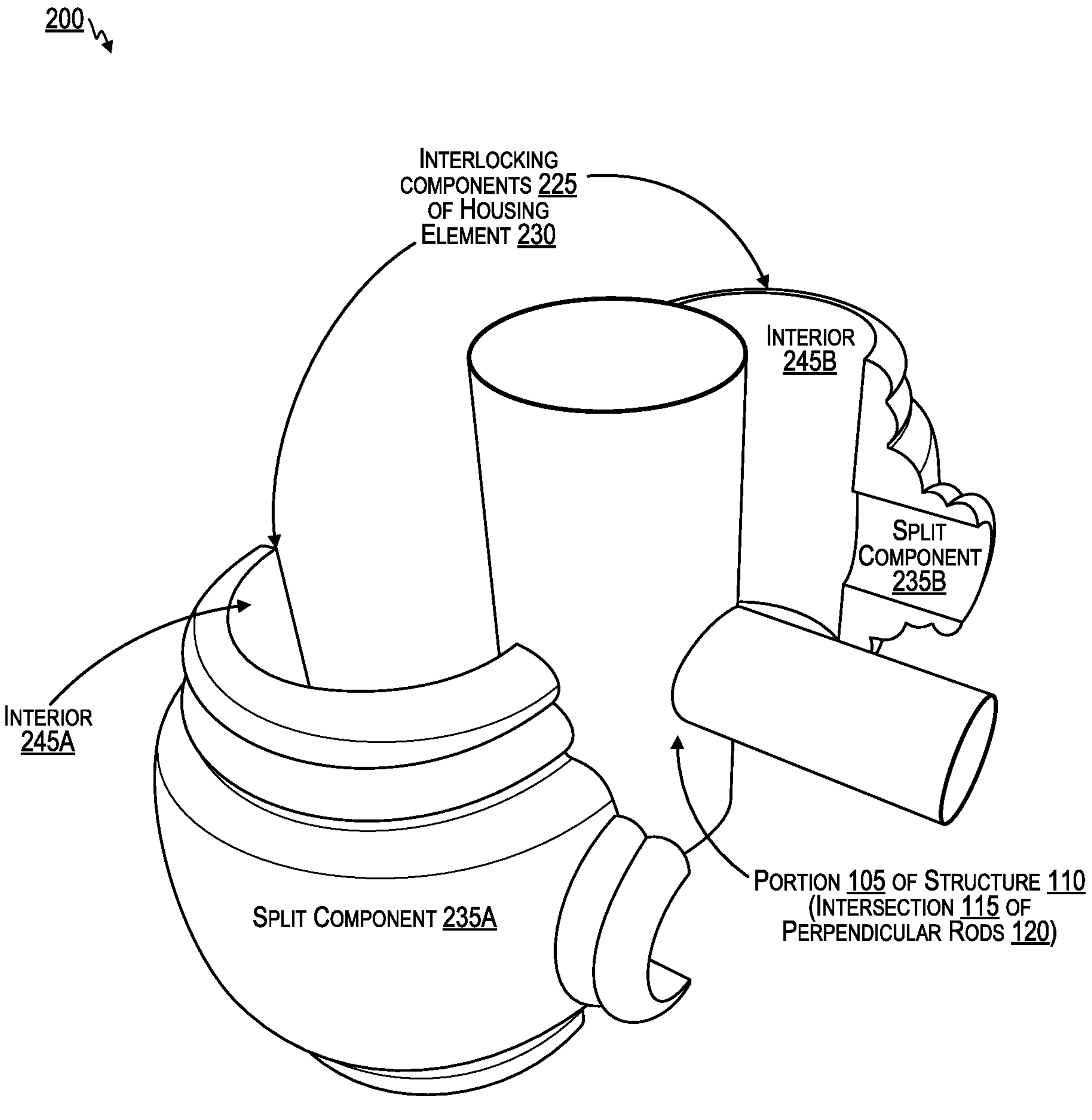
FIG. 2 is an exploded perspective diagram illustrating an interchangeable structural configuration system with a housing element with interlocking components that include two split components, and having a design to apply to the portion of the structure, in accordance with some examples.

FIG. 2 is an exploded perspective diagram illustrating an interchangeable structural configuration system 200 with a housing element 230 with interlocking components 225 that include two split components 235A-235B, and having a design to apply to the portion 105 of the structure 110. The housing element 230 of FIG. 2 is designed to house the same portion 105 of the structure 110 illustrated in FIG. 1, with the intersection 115 of perpendicular rods 120. The housing element 230 includes some similarities to the housing element 130 of FIG. 1 and some differences from the housing element 130. The two split components 235A-235B of the housing element 230 of FIG. 2 share some of the shape attributes of the split components 235A-235B of the interchangeable structural configuration system 100 of FIG. 1, such as some of the curvatures and edges. However, the housing element 230 of FIG. 2 lacks the band 150 of the housing element 130 of FIG. 1, lacks an opening in the sides of the split components 235A-235B that was present in the sides of the split components 135A-135B to accommodate the band 150, and lacks the slot 155 and/or other slots or fasteners intended to secure the band 150 to the split components 135A-135B. The split components 235A-235B include a bulbous curved side in place of the opening that the split components 135A-135B have to accommodate the band 150.

Because the band 150 is missing from the housing element 230 of FIG. 2, the housing element 230 may be secured and/or fastened differently than the housing element 130 of FIG. 1. For instance, while the band 150 could help to secure and/or fasten the interlocking components 125 to one another and/or to the portion 105 of the structure 110, the interlocking components 225 of the housing element 230 can instead secure and/or fasten to one another and/or to the structure 110 using magnets and/or ferromagnetic materials along the interiors 245A-245B of the split components 235A-235B. In some examples, the structure 110 itself may include magnets that are configured to attach and/or couple to magnets and/or ferromagnetic materials in the housing element 230 (e.g., along the interiors 245A-245B of the split components 235A-235B) to secure the housing element 230 to the structure 110. In some examples, the interiors 245A-245B of the split components 235A-235B include latches or clips that snap the split components 235A-235B to one another. The different shape attributes of the interlocking components from FIG. 1 and FIG. 2 exemplify how a manufacturer, retailer, reseller, and/or end consumer may uniquely customize the structure 110 of an object (e.g., an article of furniture) utilizing various housing elements with differently customized shape attributes.

Figure 3:
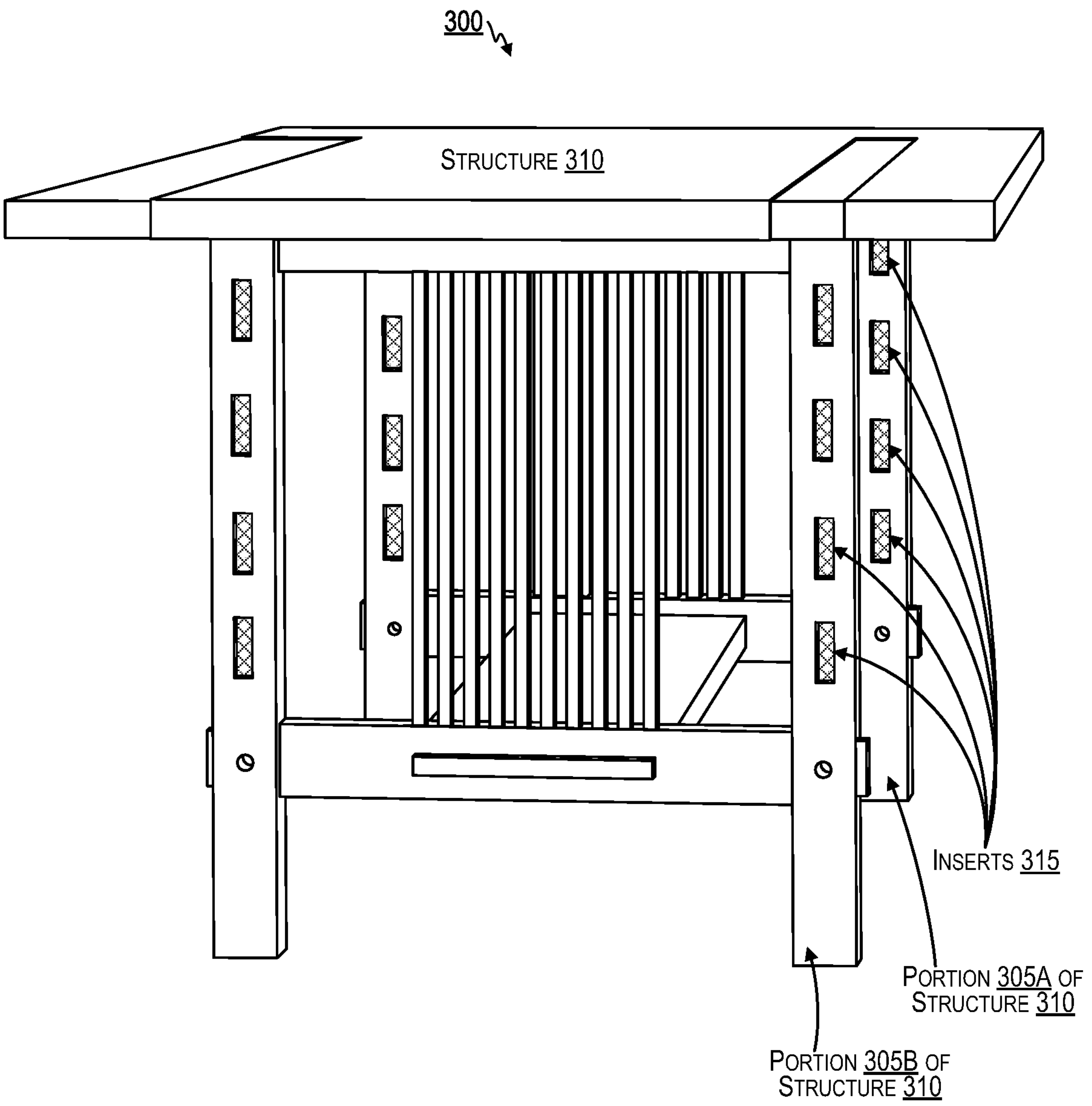
FIG. 3 is a perspective diagram illustrating an interchangeable structural configuration system with inserts for portions of a structure, in accordance with some examples.

FIG. 3 is a perspective diagram illustrating an interchangeable structural configuration system 300 with inserts 315 for portions 305A-305B of a structure 310. The structure 110 is illustrated in FIG. 3 as a table, such as a wooden table. The portions 305A-305B of the structure 110 are different legs of the table. The portions 305A-305B of the structure 110 (the legs of the table) include slots. The inserts 315 are shaped to insert into the slots in the portions 305A-305B of the structure 110 (the legs of the table) to customize the portions 305A-305B of the structure 110. The inserts 314 are customized to be detachably secured into the slots in the portions 305A-305B of the structure 310 to apply shape attribute(s) of the inserts 315 (e.g., customized patterns, textures, shapes, and/or other types shape attributes discussed herein) to the structure 310. For instance, the inserts 315 of FIG. 3 are illustrated having a crosshatched mesh pattern. Insertion of the inserts 315 into the slots in the table legs applies the crosshatched mesh pattern to the table legs, and thus, to the table. In some examples, the inserts 315 can be secured to the structure 310 using one or more of the various types of fasteners discussed herein. In some examples, the inserts 315 can be secured to one or more housing elements (e.g., such as housing element 130 or housing element 230) and/or one another one of the inserts 315 using one or more of the various types of fasteners discussed herein. In some examples, the inserts 315 can include interlocking components that can interlock with one another, with the structure 310 (e.g., with one or more of the portions 305A-305B), with one or more housing elements (e.g., such as housing element 130 or housing element 230), and/or one another one of the inserts 315. While no housing elements are illustrated as secured to and housing any portions of the structure 310, it should be understood that housing elements, such as the housing element 130 or housing element 230, can be secured to the portions 305A-305B of the structure 310 (the legs of the table) and/or to other portions of the structure 310 (e.g., the tabletop or various intersections or joints of the table). In some examples, the structure 310 can be customized with a combination of inserts 315 and housing elements. In some examples, the housing elements can receive interchangeable inserts 315 themselves. In some examples, a housing element can, when secured to the structure 310, form a slot between a part of the housing element and a part of the structure, with this slot able to receive interchangeable inserts 315. The inserts 315 may be inserted onto the structure by having the an inner surface of a slot in one of the portions 305A-305B of the structure 310 contact a surface of an insert of the inserts 315. In some examples, housing elements can be attached inside the concave parts of the furniture, the concave parts of the furniture including table leg cutouts.

Figure 4:
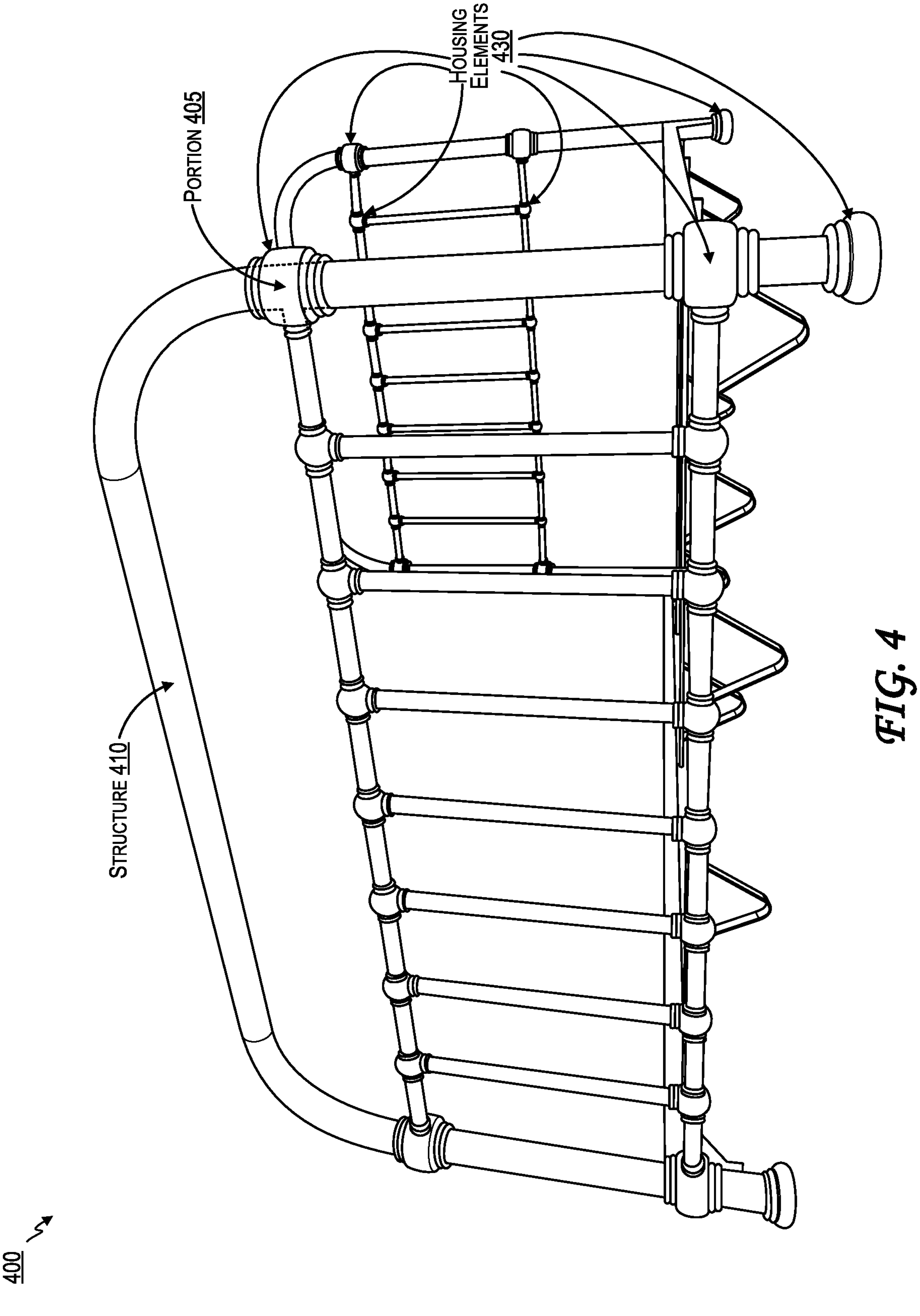
FIG. 4 is a perspective view illustrating an interchangeable structural configuration system with a set of housing elements with a matching shape attribute secured to different portions of a structure, in accordance with some examples.

FIG. 4 is a perspective view illustrating an interchangeable structural configuration system 400 with a set of housing elements 430 with a matching shape attribute secured to different portions of a structure 410. The structure 410 of FIG. 4 is illustrated as a bed frame. In an illustrative example, the structure 410 is a 20*th* century Americana iron bed frame. The different portions of the structure 410 to which the set of housing elements 430 is applied includes, for instance, a portion 405, which is illustrated using dashed lines within a specific housing element of the housing elements that is already secured around the portion 405 of the structure 410 as illustrated. The set of housing elements 430 all share a shape attribute that makes the set of housing elements 430 all appear as a cohesive set that applies a cohesive style to the structure 410. For instance, the set of housing elements 430 illustrated in FIG. 4 share the shape attributes of a rounded shape with double rings extending from the rounded shape in the direction(s) that any rod(s) of the structure 410 extend from the various portions. For instance, in an illustrative example, the portion 405 is a "T" intersection of two perpendicular rods of the structure 410, similar to the intersection 115 of the perpendicular rods 120. The housing element that houses the portion 405 includes a larger rounded element housing the "T" intersection itself as well as double rings around the rods toward each of the three directions in which the perpendicular rods extend from the intersection. Different housing elements of the set of housing elements 430 include slightly differing shapes and sizes depending on the portion of the structure 410 that a given housing element houses. For instance, housing elements that house the bases of the legs of the bed include only one large rounded bulbous shape and one set of double rings around the leg of the bed directed upward. Housing elements that house thinner or smaller rods, bars, tubes, or components of the structure 410 can be smaller than housing elements that house thicker or larger rods, bars, tubes, or components of the structure 410. For instance, the housing elements that house the intersections of the bars that make up the headboard and footboard of the bed frame are smaller than the housing elements that house the corners of the bed frame based the bars that make up the headboard and footboard of the bed frame are smaller than the corners of the bed frame. However, the shape attribute(s) of the larger rounded bulbous shape and the double ring shape are present for all of the hosing elements 430 in the set. In some examples, the each of the housing elements 430 may be configured to detachably house a different one of a plurality of portions (e.g., portion 405 as well as other portions) of the structure 410.

One of the benefits that the housing elements 430 provide is that, if a user wishes the change a look, feel, style, design, and/or structural configuration of the structure 410, the user need only replace the housing elements 430 with housing elements from a different set, with the housing elements in the different set sharing a different shape attribute. For instance, a user can replace the housing elements 430 with housing elements from a different set in which the housing elements are all cubic in shape, giving the structure a more boxy design and configuration. In some examples, some sets of housing elements 430 can include inserts to the housing elements 430 themselves and/or to the structure 410, such as the inserts 315 to the structure 310 in FIG. 3. In some examples, a shared shape attribute in a set of housing elements 430 can include, for instance, shared shape, curvature, curve radius, pattern, outline, layout, design, ornamentation, pattern, mesh, an arrangement of edges and/or corners and/or curves or any of the previously listed elements, or a combination thereof.

As noted above, the housing elements 430 share at least one shape attribute. In some examples, the housing elements 430 share at least one material or set of materials. For instance, in some examples, the housing elements 430, the interlocking components that make up the housing elements (e.g., the interlocking components 125 and/or the interlocking components 225), any associated inserts (e.g., inserts 315), and/or any associated fasteners can include, and/or be manufactured from, any of: steel, cast iron, wrought iron, iron, anodized aluminum, aluminum, wood, carbon fiber, an epoxy granite composite, plastic, thermoplastic, ceramic, glass, nickel, brass, bronze, copper, gold, silver, magnesium, lead (e.g., with safety precautions), stone, cement, marble, another material or composite discussed herein, a composite of any of the materials discussed herein, or a combination thereof. In some examples, the set of housing elements 430 share at least one material or set of materials, for instance all being made from a combination of iron and wood. In some examples, if a user wishes to change the look, feel, style, design, and/or structural configuration of the structure 410, the user can replace the set of housing elements 430 with a different set of housing elements, with the housing elements in the different set sharing a different material or set of materials, such as plastic and aluminum.

In some examples, the plurality of housing elements with a shared shape attribute can be configured to house and/or be inserted onto or into portions (e.g., corners) of a structure such as a chair seat, the bed frame of FIG. 4, a vehicle, or another type of structure. Differently customized sets of shapes or patterns of the plurality of housing elements can be manufactured or printed to be interchangeably configured to be inserted onto and/or into the portions of the structure, or other portions of the structure of the furniture as a part of the interchangeable componentry. In some examples, the housing elements can be selected and configured to better match or contrast with the legs of the chair. In another example, customized patterns include a Voronoi pattern where a plane or surface is partitioned into regions.

Figure 5:
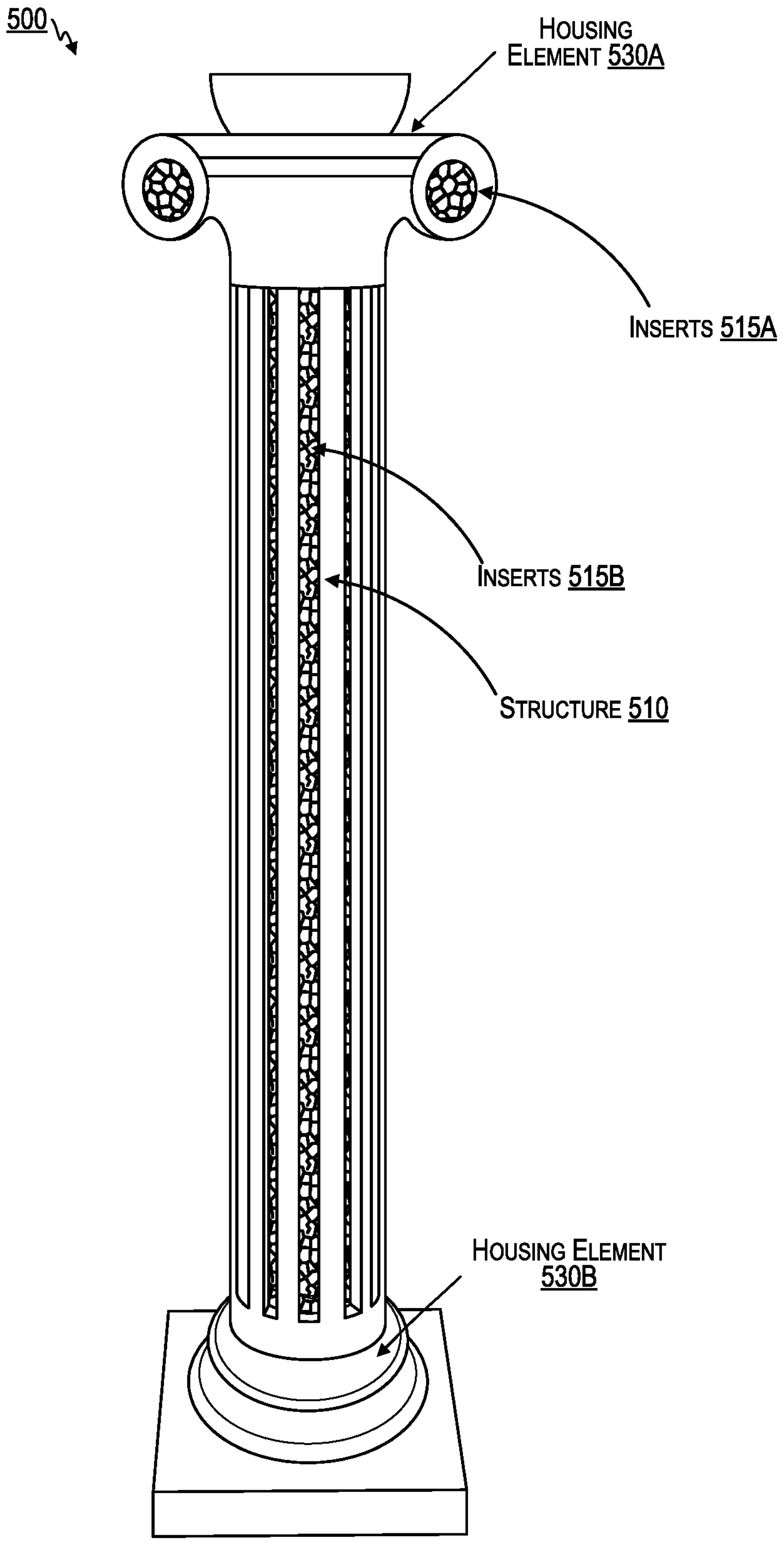
FIG. 5 is a front view diagram illustrating an interchangeable structural configuration system in which housing elements provide a column casing around portions of a structure (e.g., a leg of an article of furniture or a support for a building) and with inserts providing a mesh, in accordance with some examples.

FIG. 5 is a perspective diagram illustrating an interchangeable structural configuration system 500 in which housing elements 530A-530B provide a column casing around portions of a structure 510 (e.g., a leg of an article of furniture or a support for a building) and with inserts 515A-515B providing a mesh. The structure 510 is a tube or rod having gaps through which a hollow central portion is visible. The hollow central portion can receive inserts 515B to be inserted into the hollow central portion. A top housing element 530A is secured to a top end of the structure 510, and a bottom housing element 530B is secured to a bottom end of the structure 510. The housing elements 530A-530B share a shape attribute, sharing an Ionic column style as a shape attribute. In other examples, a shared shape attribute may include an Ionic column style, Tuscan column style, a Doric column style, a Corinthian column style, a composite column style, or a combination thereof. The top housing element 530A includes two slots in the volutes of the column design into which inserts 515A can be inserted. The inserts 515A and the 515B are illustrated as including a Voronoi mesh pattern. The housing elements 530A-530B can be made up of one or more interlocking components each, the interlocking components configured to secure to other interlocking components of the housing elements 530A-530B, to the structure 510 itself, and/or to the inserts 515A-515B. In some examples, the elements of the interchangeable structural configuration system 500 that are identified in FIG. 5 as being the housing elements 530A-530B can actually be part of the structure 510 instead.

In some examples, the structure 510 includes a leg of an article of furniture such as a chair or a table. In some examples, multitudes of customized shapes or patterns of the plurality of housing elements can be manufactured and/or printed to be configured to be inserted onto and/or into the portions of the structure 510. A shape attribute or the pattern of the configured housing elements can be shared throughout the different housing elements 530A-530B, for instance apply a shared column style (e.g., Ionic) to the structure 510. In some examples, other shape attributes can also vary throughout the outer surface of the plurality of interlocking components. The choice of design can vary according to the user's preferences. For instance, the user can switch out the set of housing elements 530A-530B having the Ionic column design for a different set of housing elements having a different shared shape attribute corresponding to a different column design style (e.g., Doric). Also as shown in the example in FIG. 5, the bottom housing element 530B of the set of housing elements can house the bottom surface of the structure to provide an additional layer of protection from frictional scratch or abrasion. The housing element, depending on the user's preference, can also allow a height adjustment option that can be conducted by adjusting the thickness of the bottom layer. In some examples, a chair, table, bed frame, or other article of furniture can have a structure 510 that resembles the structure 510 shown in FIG. 5, and can apply housing elements and/or inserts such as the housing elements 530A-530B and the inserts 515A-515B, to enhance the durability of the legs, configure the structure to apply the shape attribute (e.g., the Ionic column style), and provide the user with an elevated feel. The top housing element 530A of the set of housing elements 530 illustrates either the interlocking components of the fastener, customized according to the user's preference, that provides additional protection and elevation similar to the bottom housing element 530.

Figure 6:
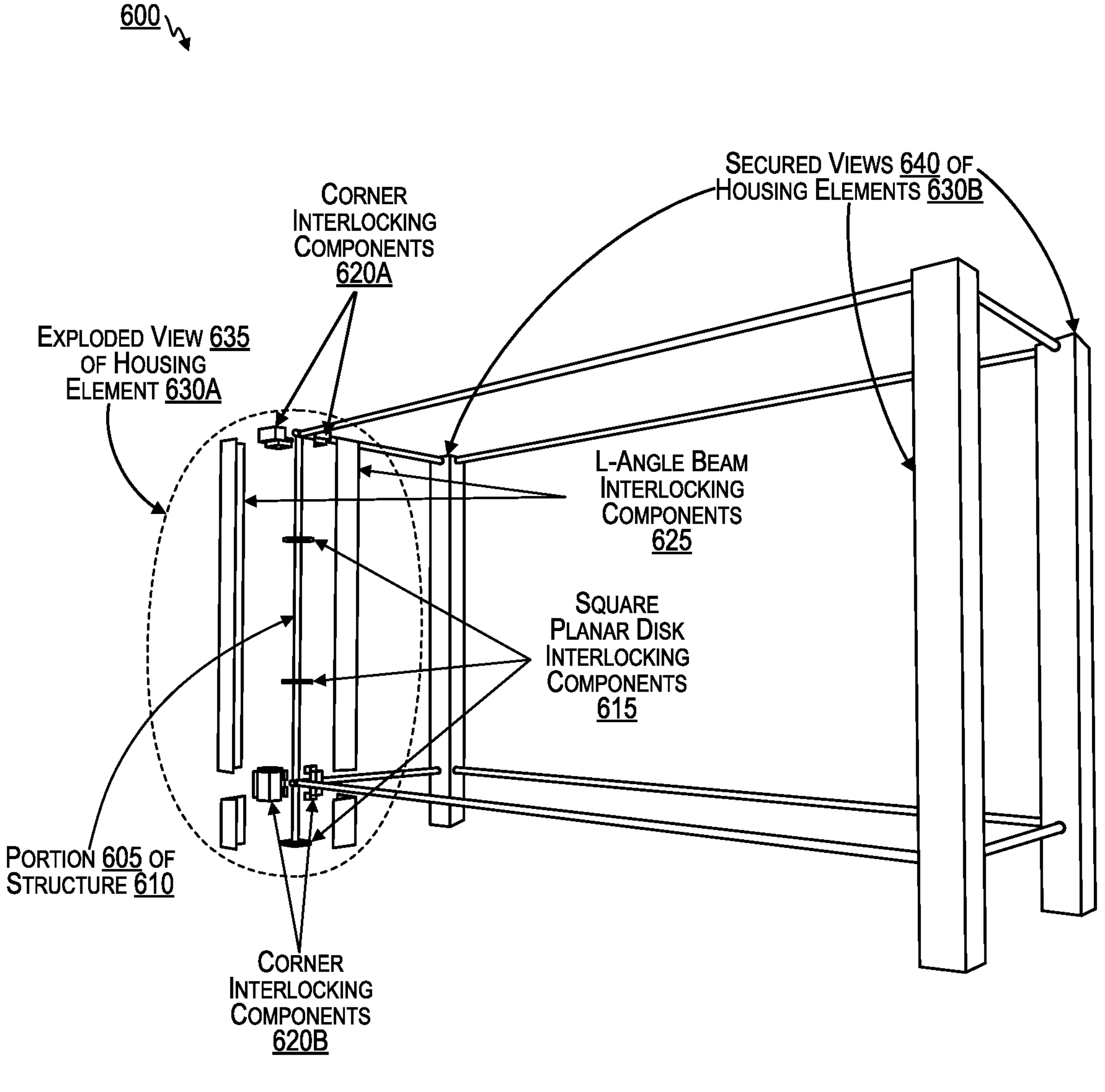
FIG. 6 is a perspective diagram illustrating an interchangeable structural configuration system in which housing elements are applied to portions of a structure, the perspective diagram showing an exploded view of a housing element and a secured view of several housing elements, in accordance with some examples.

FIG. 6 is a perspective diagram illustrating an interchangeable structural configuration system 600 in which housing elements 630A-630B are applied to portions of a structure 610, the perspective diagram showing an exploded view 635 of a housing element 630A and a secured view 640 of a several housing elements 630B. The structure 610 of FIG. 6 can represent an article of furniture (e.g., a table), a building, or another type of structure. The interchangeable structural configuration system 600 secures housing elements 630A-630B around portions of the structure 610, specifically around vertical rods or columns in the structure 610. The exploded view 635 illustrates a plurality of interlocking components and/or fasteners of a housing element 630A that is to be secured about a portion 605 (e.g., a rigid vertically oriented rod that intersects with several horizontal rods at two elevations), including square planar disk interlocking components 615 secured around the portion 605 of the structure 610 at multiple elevations along the portion 605 of the structure 610, placed apart from each other with a distance in between. The planes of the square planar disk interlocking components 615 are perpendicular to the length of the rigid vertical rod of the portion 605 of the structure 610. The interlocking components of the housing element 630A also include corner interlocking components 620A-620B secured to the corners of the portion 605 structure 610 at which the vertical rod intersects with the horizontal rods (e.g., secured to the intersection of the rods). The square planar disk interlocking components 615 and the corner interlocking components 620A-620B couple to L-angle beam interlocking components 625 that apply a squared shape attribute to the rigid vertical rod of the portion 605 of the structure 610. The square planar disk interlocking components 615 and the corner interlocking components 620A-620B provide structural strength and integrity to the L-angle beam interlocking components 625, ensuring that the L-angle beam interlocking components 625 remain secured in place without bowing rotating, or coming apart unless the user intentionally detaches the interlocking components of the housing element 630 from one another.

Secured views 640 are also illustrated of three housing elements 630B secured to three other respective portions of the structure 610. While the exploded view 635 of the housing element 630A shows each of the various interlocking components of the housing element 630A, the secured views 640 of the housing elements 630B show how the housing elements 630B look when all of their respective interlocking components are secured (e.g., to one another and/or to the respective portions of the structure). The configuration of the illustrated housing elements 630A-630B, and their various interlocking components, can be detachably secured using fasteners, such as at least one protrusion configured to interface with the at least one dent or hole in the structure and/or in other interlocking component(s).

In some examples, the design of housing element(s) (e.g., housing elements 630A-630B), interlocking components and/or fasteners thereof, insert(s) (e.g., inserts 315, inserts 515A-515B), a structure itself (e.g., structure 610), and/or a secured arrangement in which the housing element(s) are secured about a structure and/or inserts are inserted into a structure, can be designed and/or customized using a computing system such as the computing system 1100. In some examples, a non-fungible token (NFT) may be generated by a computing system and associated with the design of housing element(s) (e.g., housing elements 630A-630B), inserts (e.g., inserts 315, inserts 515A-515B), the structure 610 itself, a secured arrangement in which the housing element(s) are secured about a structure and/or inserts are inserted into a structure. In some examples, the NET includes digital data stored in payload(s) of one or more blocks of a distributed ledger (e.g., a blockchain ledger). The payload(s) of the block(s) of the distributed ledger can record ownership of the NET by one or more users or user accounts, and/or can record changes to such ownership (e.g., a user selling or otherwise transferring their ownership of the NET to another user), which may be executed via smart contract. In some examples, the NFTs include references (e.g., links, pointers, uniform resource locators (URLs), uniform resource identifiers (LIMO, or other references) to digital files such as photos, videos, and audio, or design specifications. The NFTs can be uniquely identifiable to provide a proof of ownership of the design, for instance of one or more of the housing elements in a set of housing elements. In some examples, the NFT, and/or associated systems (e.g., the distributed ledger and associated smart contracts), can either restrict the sharing or copying of digital file(s) associated with the housing elements in a set of housing elements, or cannot restrict such sharing or copying. In some examples, the NFT, and/or associated systems, can track the sharing or copying of digital file(s) associated with the housing elements in a set of housing elements. The creation of NFTs that reference identical files may be allowed and the placement of the NET and associated data on the blockchain allows for tracking and/or tracing of the data.

In some examples, the design of the each of or the plurality of the housing elements is imported as a digital file into an open online platform that allows the original designer of the housing element to upload the design, wherein the design has an NFT associated with it. The uploaded design can be accessed by another user of the open online platform to be customized on a compatible 3D design software after download by using the pre-existing software solutions, including apparatus such as mobile devices, virtual reality, traditional desktop, laptop, and notebook solutions, via application programming interfaces (APIs).

The customized design can be reuploaded to the online platform for the other users to use or redesign. The initial design or the customized design can be exported into the compatible 3D design software to be printed or manufactured in various geographical locations and facilities without having the printing or manufacturing site limited to some of the designated locations. The utilization of the online platform to import and export the design can help facilitate the supply of printed or manufactured designs.

Figure 7:
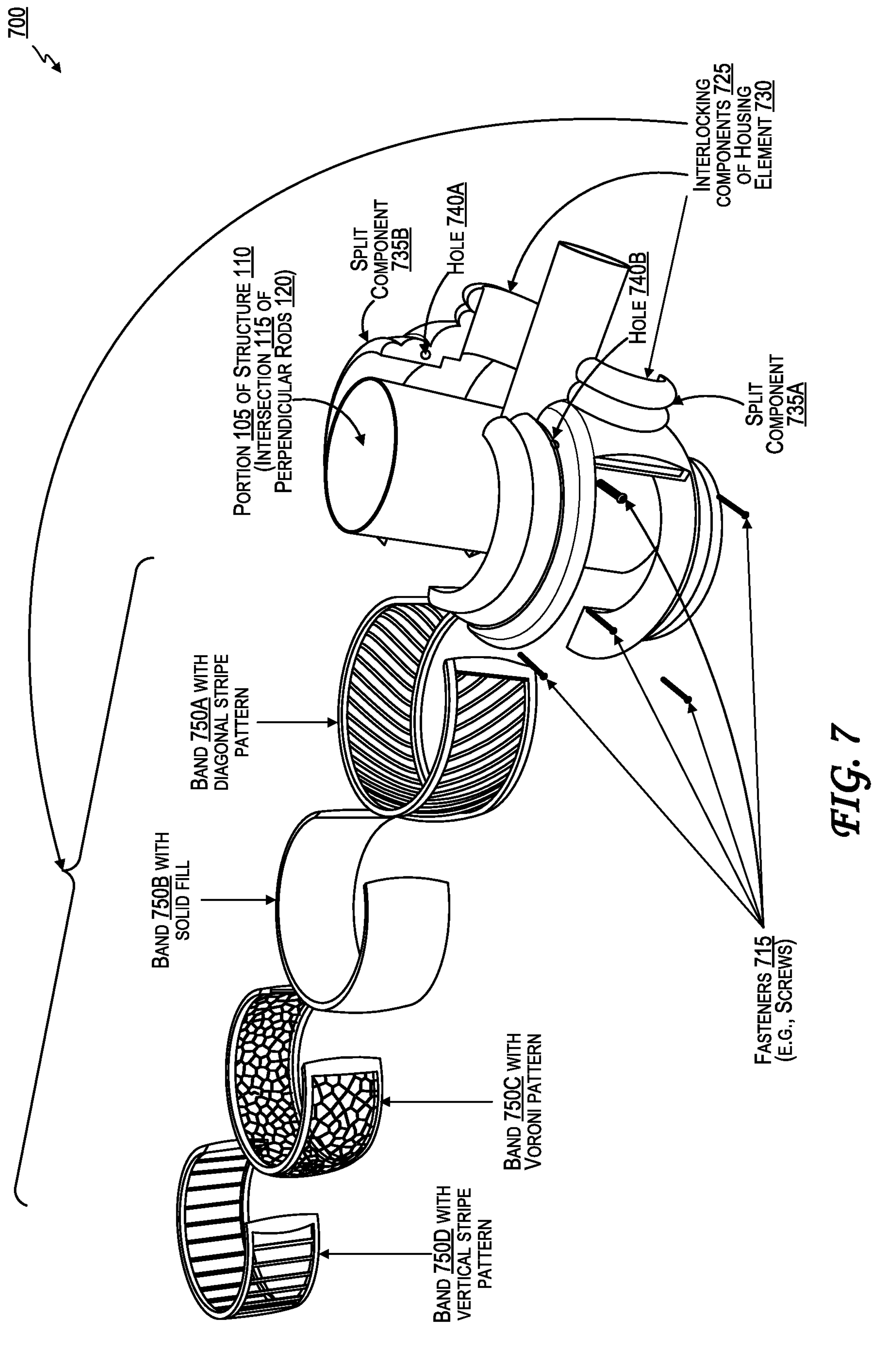
FIG. 7 is an exploded perspective diagram illustrating an interchangeable structural configuration system with a housing element with interlocking components secured using fasteners, the interlocking components including two split components and a band having different variations, the housing element having a design to apply to a portion of a structure, in accordance with some examples.

FIG. 7 is an exploded perspective diagram illustrating an interchangeable structural configuration system 700 with a housing element 730 with interlocking components 725 secured using fasteners 715, the interlocking components 725 including two split components 735A-735B and a band 750A-750D having different variations, the housing element 730 having a design to apply to a portion 105 of a structure 110. The housing element 730 of FIG. 7 is designed to house the same portion 105 of the structure 110 illustrated in FIG. 1, with the intersection 115 of perpendicular rods 120. The housing element 730 includes some similarities to the housing element 130 of FIG. 1 and some differences from the housing element 130. For instance, the split components 735A-735B share a general shape and design with the split components 135A-135B, but include holes (e.g., hoes 740A-740B) to receive fasteners 715 (e.g., screws and/or nails and/or other types of fasteners discussed herein) that fasten the split components 735A-735B to one another and/or to the portion 105 of the structure 110. The band 750A-750D is similar in shape to the band 150 of FIG. 1, but includes four different variations having different patterns, which can be interchangeable. For instance, the different variations on the band 750A-750D include a band 750A with a diagonal stripe pattern, a band 750B with a solid fill, a band 750C with a Voronoi pattern, and a band 750D with a vertical stripe pattern. According to the user's preferences, the variation of the band 750A-750D with a certain pattern that can be configured to detachably secure to the split components 735A-735B and/or to the portion 105 of the structure 110, and can be removed and replaced with another band 750A-750D with a different pattern. As shown in the figure, the band 750A-750D can be configured to slot into the openings along the sides of the split components 735A-735B of the interlocking components 725. In some examples, the band 750A-750D can be manufactured by using, for example, a 3D printer according to the user's customization, for instance using a custom pattern.

Figure 8:
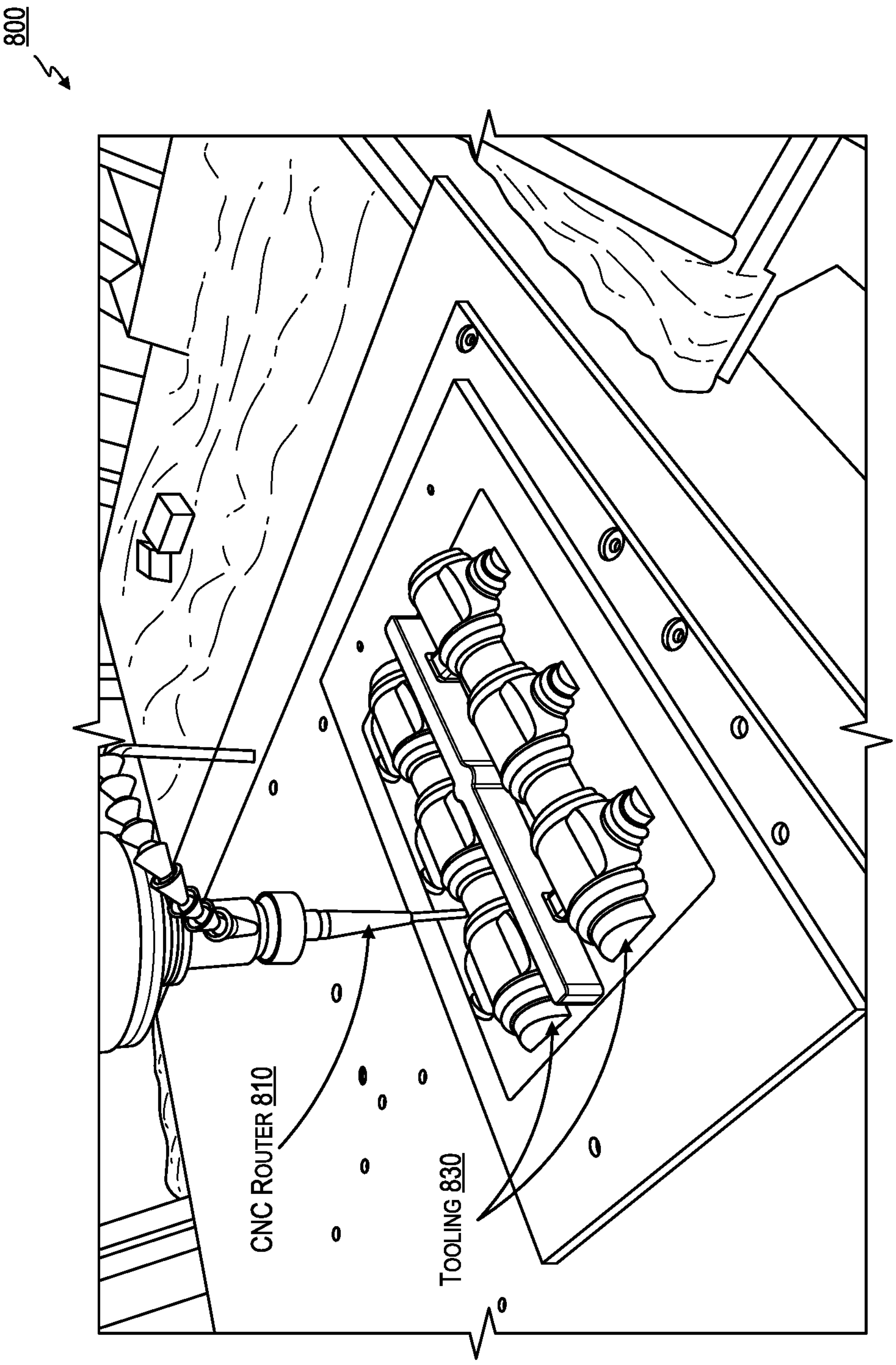
FIG. 8 is a perspective diagram illustrating an exemplary manufacturing process for making tooling for housing elements and/or interlocking components, in accordance with some examples.

FIG. 8 is a perspective diagram illustrating an exemplary manufacturing process 800 for making tooling 830 for housing elements and/or interlocking components. In some examples, the tooling 830 includes a push plate for sand casting. In some examples, the tooling 830 (e.g., the push plate) can be used in a foundry to leave an impression of the design in packed sand to be filled with molten metal. Once the molten metal cools, the result can be used as housing element and/or interlocking component as described herein, in some cases after some additional modifications (e.g., sanding, filing, polishing, drilling of holes for fastener(s), coupling fastener(s) to the results, or a combination thereof).

The process 800 for making the tooling 830 may be performed using a CNC router 810 that receives a 3D model of a set of housing elements that commands the CNC router 810 with a series of instructions to manufacture the tooling 830 according to the 3D model. The 3D model includes the shared shape attribute that is shared among the set of housing elements, which can include a curved shape with double rings in the housing elements, similar to the housing elements 230 and the housing elements 430. The CNC router 810 then manufactures the tooling 830 to be used for manufacturing tooling 830 for interlocking components according to the instructions that teach where to move, at what speed, and with how much power. In some examples, the CNC router 810 can manufacture tooling 830 for different interlocking components separately, and/or tooling 830 for interlocking components that are already interlocked together to form at least a portion of a housing element. In some examples, the CNC router 810 can manufacture tooling 830 for different interlocking components separately, together, concurrently, in parallel, in series, or a combination thereof.

While the CNC router 810 of FIG. 8 is labeled as manufacturing tooling 830 to then be used for making housing elements and/or interlocking components, in some examples, the CNC router 810 can be used to make the housing elements and/or interlocking components directly. For instance, the CNC router 810 can receive a 3D model of a set of housing elements and/or interlocking components that commands the CNC router 810 with a series of instructions to manufacture the set of housing elements according to the 3D model. The 3D model includes the shared shape attribute that is shared among the set of housing elements, which can include a curved shape with double rings in the housing elements illustrated in FIG. 8, similarly to the housing elements 230 and the housing elements 430. The CNC router 810 then manufactures the interlocking components according to the instructions that teaches where to move, at what speed, and with how much power. In some examples, the CNC route 810 can manufacture different interlocking components separately, or interlocked together to form at least a portion of a housing element.

The particular shape attribute(s) of the tooling 83, the interlocking components, and/or the housing elements manufactured by the CNC router 810 is an exemplary example that can be manufactured according to the user's customization. The shape attributes of the interlocking components, the housing elements, and/or the tooling 830 can vary depending on the 3D model the user creates and customizes. In some examples, at least one of a set of one or more interlocking components, housing elements, and/or tooling 830 can be manufactured using at least one of a 3D printer, a CNC router, a cast iron foundry, welding, hand forging, hand carving, injection molding, sand casting, die casting, a water jet cutter, a laser cutter, a saw, a router, a drill, a sander, a die grinder or Dremel, a honer, a polisher, an engraver, a burner, a melter, a shaper, a cutter, a hammer, or a combination thereof.

Figure 9:
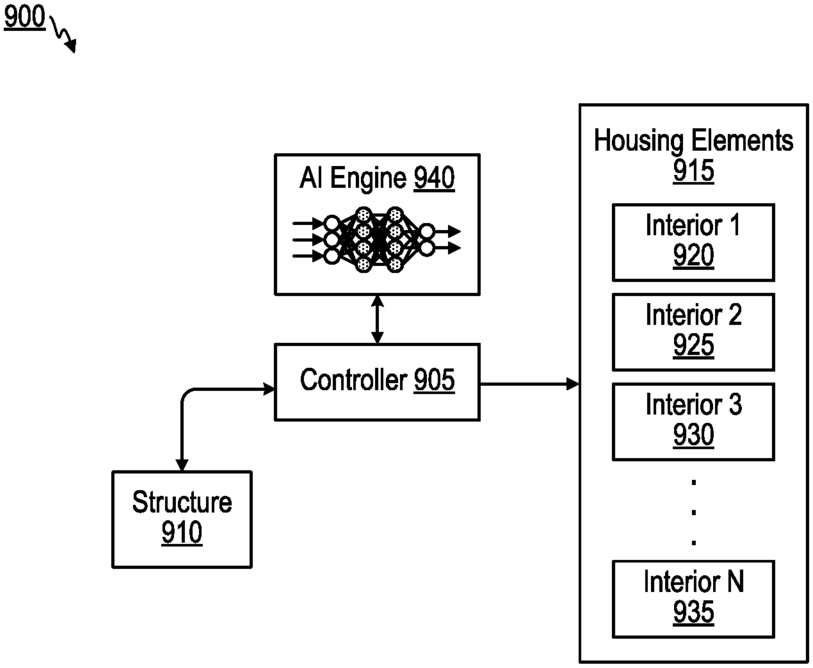
FIG. 9 is a block diagram illustrating a computing system with a controller that can be used to customize housing elements to a structure, in accordance with some examples.

FIG. 9 is a block diagram illustrating a computing system 900 with a controller 905 that can be used to customize housing elements 915 to a structure 910. The controller 905 is first configured to analyze the shapes of the plurality of respective portions of the structure 910 where housing elements 915 are intended to be configured. After the analysis, the controller 905 is configured to use the analyzed shapes to initiate designing the respective interiors 920-935 of the plurality of housing elements 915 (and/or interlocking components thereof) that correspond to the outer shapes of the plurality of portions of the structure. The interiors may vary according to the portion of the structure that was analyzed. For example, one interior 920 that was designed to conform to, and/or house, a particular portion of the structure 910 may differ from another version of the interior 925 that was designed to conform to, and/or house, a different portion of the structure 910. In some examples, many interiors 920-935 can be designed differently to match the outer shapes of their respective portions of the structure. In some examples, different designs for different styles of housing elements 915 may share same interiors 920-935 to be interchangeably configured to the same portion of the structure 910.

In some examples, the computing system 900 includes an artificial intelligence (AI) engine 940 that the controller 905 can use to customize the design(s) of the housing elements 915 based on the structure 910 and/or based on a shared shape attribute. In some examples, the AI engine 940 includes a generative AI system, one or more trained machine learning (ML) models, one or more large language models (LLM), or a combination thereof. Within FIG. 9, a graphic representing the AI engine 940 illustrates a set of circles connected to another. Each of the circles can represent a node, a neuron, a perceptron, a layer, a portion thereof, or a combination thereof. The circles are arranged in columns that can represent layers, for instance layers of a neural network. The leftmost column of white circles represent an input layer. The rightmost column of white circles represent an output layer. Two columns of shaded circled between the leftmost column of white circles and the rightmost column of white circles each represent hidden layers. The lines between nodes can represent weights between nodes. The weights can be set and/or modified as the ML model associated with the AI engine 940 is trained and/or updated, for instance strengthening the weights based on positive feedback to an output to encourage similar outputs given similar inputs, and/or weakening or removing the weights based on negative feedback to an output to discourage similar outputs given similar inputs.

Described herein is a method for interchangeable structural configuration. The method involves manufacturing process of the structures and the manufacturing of housing elements that can be detachably secured to the structure or other housing elements that are interlocking components. The design of the structure can be changed by simply replacing the plurality of housing elements instead of the entire piece of furniture. In some examples, the process can include providing through manufacturing or printing a plurality of housing elements with respective exteriors that share at least one shape attribute, a plurality of portions of a structure, a plurality of interlocking components, and a plurality of fasteners.

Figure 10:
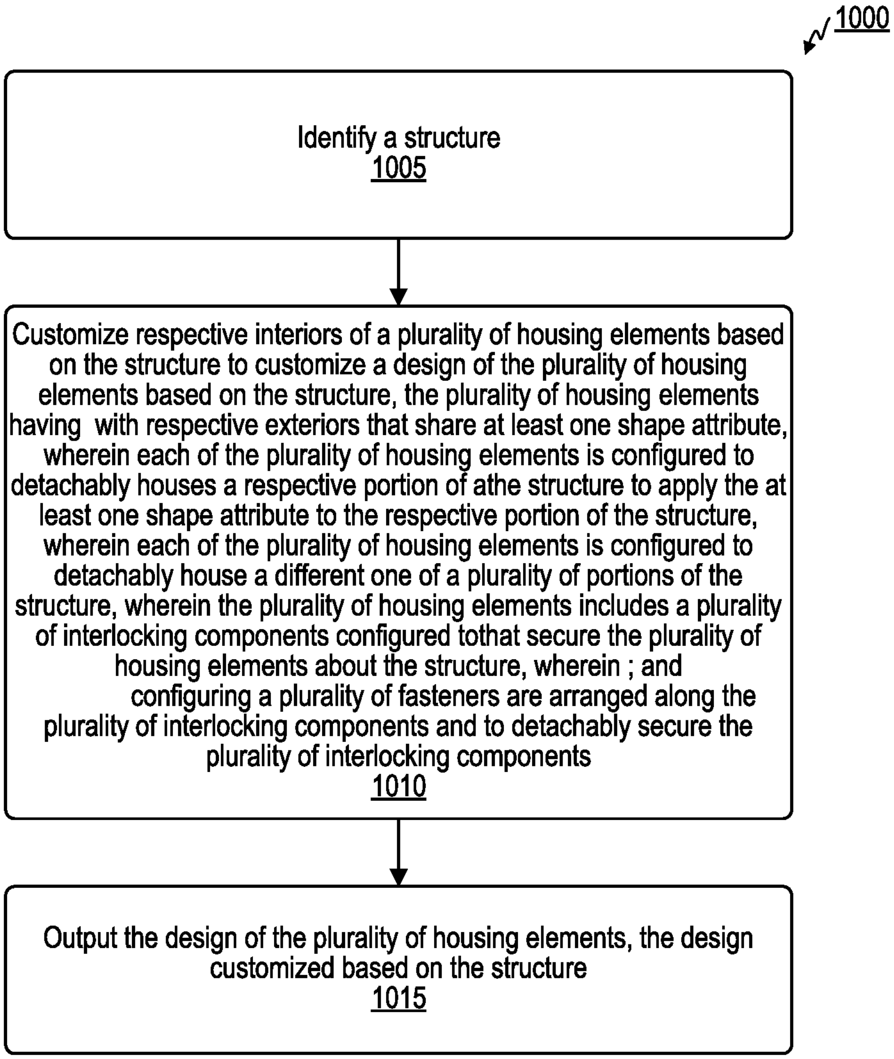
FIG. 10 is a flow diagram illustrating an exemplary process for a method for interchangeable structural configuration, in accordance with some examples.

FIG. 10 is a flow diagram illustrating an exemplary process 1000 for a method for interchangeable structural configuration, in accordance with some examples. The process 1000 can be performed using a structural configuration system. The structural configuration system can include, for example, the interchangeable structural configuration system 100, the interchangeable structural configuration system 200, the interchangeable structural configuration system 300, the interchangeable structural configuration system 400, the interchangeable structural configuration system 500, the interchangeable structural configuration system 600, the interchangeable structural configuration system 700, the CNC router 810, the computing system 900, the controller 905, the computing system 1100, the processor 1110, a system, an apparatus, a device, a controller, a non-transitory computer-readable storage medium storing instructions for a program to be executed using a processor, or a combination thereof.

At operation 1005, the structural configuration system is configured to, and can, identify a structure, such as the structure 110, the structure 310, the structure 410, the structure 510, or the structure 610.

At operation 1010, the structural configuration system is configured to, and can, customize respective interiors of a plurality of housing elements (e.g., housing element 130, housing element 230, housing elements 430, housing elements 530A-530B, housing elements 630A-630B, housing or element 730) based on the structure to customize a design of the plurality of housing elements based on the structure. The plurality of housing elements have respective exteriors that share at least one shape attribute (e.g., shared shape, curvature, curve radius, pattern, outline, layout, design, ornamentation, pattern, mesh, an arrangement of edges and/or corners and/or curves or any of the previously listed elements, or a combination thereof). Each of the plurality of housing elements detachably houses a respective portion of the structure to apply the at least one shape attribute to the respective portion of the structure of a plurality of portions of the structure. The plurality of housing elements includes a plurality of interlocking components (e.g., interlocking components 125, interlocking components 225, interlocking components 625, interlocking components 725) that secure the plurality of housing elements about the structure. A plurality of fasteners (e.g., fasteners 715) are arranged along the plurality of interlocking components and detachably secure the plurality of interlocking components.

The fasteners can include, for example, screws received by threaded screw holes, nails received by nail holes, posts received by post holes, protrusions or tabs received by holes or slots, magnets that attract to and magnetically couple to other magnets or ferromagnetic materials (e.g., ferromagnetic metals), adhesives, hook-and-loop fasteners, bolts or nuts receives onto threaded posts or shanks, keys received by key-ways, washers, anchors, rivets, studs, inserts, hinges, clasps, latches, grommets, gaskets, retaining rings, pins, Clevis pins, Cotter pins, suction cups, buttons (e.g., clothing buttons), buckles, snaps, zippers, hooks, toggles, links, chains, rubber bands, hook and eye fasteners, frog fasteners, cords ropes (e.g., to be tied or untied or secure or loosen), sliders, clasps, interlocking mechanism(s), any other fasteners discussed herein, or combinations thereof.

At operation 1015, the structural configuration system is configured to, and can, output the design of the plurality of housing elements, the design customized based on the structure. For instance, outputting the design can include displaying the design on a display, sending the design to a recipient device using a communication interface (e.g., a transmitter or transceiver), or a combination thereof. In some examples, a recipient device is a manufacturing device, such as a 3D printer or a CNC router 810, which can manufacture the plurality of housing elements based on receiving the design from the structural configuration system.

In some examples, the structural configuration system includes the structure. In some examples, a housing element of the plurality of housing elements includes a concave interior surface that is wraps around a convex surface of a portion of the structure of the plurality of portions of the structure. In some examples, a housing element of the plurality of housing elements includes an interior surface formed using the plurality of interlocking components, and the interior surface defines an opening to receive a corresponding portion of the structure of the plurality of portions of the structure.

In some examples, a portion of the structure of the plurality of portions of the structure includes at least one rod, and a corresponding housing element of the plurality of housing elements detachably houses the at least one rod to apply the at least one shape attribute to the at least one rod. In some examples, a portion of the structure of the plurality of portions of the structure includes an intersection of a plurality of rods (e.g., intersection 115), and a corresponding housing element of the plurality of housing elements detachably houses the intersection to apply the at least one shape attribute to the intersection.

In some examples, a portion of the structure of the plurality of portions of the structure includes a joint that couples a first member of the structure to a second member of the structure, where the first member of the structure is movable about the joint relative to the second member of the structure within a range of movement. A corresponding housing element of the plurality of housing elements detachably houses the joint to apply the at least one shape attribute to the joint, so that the corresponding housing element preserves the range of movement associated with the joint.

In some examples, the plurality of housing elements includes at least one rigid material having a surface shaped according to the portion of the structure. In some examples, the plurality of housing elements includes at least one flexible material having a surface that flexes around the portion of the structure.

In some examples, the plurality of fasteners includes at least one fastener that detachably, secures the at least one of the plurality of interlocking components to the structure. In some examples, the plurality of fasteners includes at least one fastener that detachably secures a first interlocking component to a second interlocking component. The plurality of interlocking components includes at least the first interlocking component and the second interlocking component.

In some examples, the plurality of interlocking components includes two interlocking components, and the two interlocking components interlock to wrap around an entirety of a circumference of a corresponding portion of the structure of the plurality of portions of the structure.

In some examples, the plurality of interlocking components includes at least one hole, and at least one of the plurality of fasteners includes at least one protrusion that interfaces with the at least one hole to detachably secure the plurality of interlocking components. In some examples, at least one of the plurality of fasteners includes at least one magnet that interfaces with at least one of a second magnet or a ferromagnetic material to detachably secure the plurality of interlocking components. In some examples, at least one of the plurality of fasteners includes at least one of a latch or a clamp that transitions from an open state to a closed state to detachably secure the plurality of interlocking components. In some examples, the fasteners include a cuff or a band having a pair of resilient arms biased toward each other according to a tension force.

In some examples, the plurality of interlocking components include at least one 3D printed component that includes at least one of a metal, a plastic, a thermoplastic, or a resin. In some examples, the plurality of interlocking components are manufactured using at least one of a 3D printer, a CNC router, a cast iron foundry, welding, hand forging, hand carving, injection molding, sand casting, die casting, a water jet cutter, or a laser cutter.

In some examples, the at least one shape attribute includes at least one of a shape, a contour, an outline, a mesh, a curve, an edge, a corner, a style, or a type.

In some examples, the structural configuration system is configured to, and can, customize the housing elements based on the structure so that the respective interiors fit around respective exteriors of respective portions of plurality of portions of the structure.

In some examples, each of the plurality of housing elements with respective exteriors that share at least one shape attribute is configured to detachably house a respective portion of the structure to apply the at least one shape attribute to the respective portion of the structure. In some examples, each of the plurality of housing elements is also configured to detachably house a different one of a plurality of portions of the structure. In some examples, plurality of housing elements includes a plurality of interlocking components configured to secure the plurality of housing elements about the structure.

In some examples, The housing elements may be 3D printed or manufactured utilizing a variety of manufacturing techniques either by the same factory, a mid-supply chain manufacturer, a specialist such as a particular designer or artist, as well as the consumer themselves. The parts may be purchased, ordered, or otherwise created on demand. Various housing elements can be manufactured but are limited only to the extent they need be capable of being releasably connected to the underlying structure.

In some examples, the replacement of the customized housing elements to change partial or overall design of furniture can prolong commercial life of a furniture or a similar apparatus or at least underlying structure thereof. The replaceable housing elements can be printed or manufactured from metal, wood, thermoplastics, thermosetting plastics, acrylonitrile butadiene styrene, polylactic acid, polyethylene terephthalate glycol, Nylon, thermoplastic polyurethane, polyvinyl alcohol, high impact polystyrene, carbon fiber, kevlar, fiberglass, or various resins, which may be fully recycled or reused.

In some examples, the housing elements can be handcrafted or automatically manufactured. In some examples, the housing elements are manufactured from hand routing, a CNC routing, a cast iron foundry, welding, hand forging, hand carving, injection molding, sand casting, die casting, a water jet cutter, a laser cut, or a combination thereof.

In some examples, the housing elements can be selected via a user interface from a catalog, library, or other online marketplace or directory of stock keeping units (SKUs) and/or NFTs. In some examples, certain housing elements, their interlocking components, and/or their tooling (and/or SKUs and/or NFTs associated with any of these), can be open sourced, proprietary, limited in number, and/or unlimited in number. In some examples, using a license (e.g., open source license or otherwise) associated with housing elements can allow sharing, production, and iteration on designs for housing elements, interlocking components, and/or tooling. In some examples, designs housing elements, interlocking components, and/or tooling (and/or SKUs and/or NFTs associated with any of these) can be shared by users, sold by users, and/or purchased by users using a social networking user interface, social media user interface, a marketplace user interface, an e-commerce user interface, or a combination thereof, as with Facebook®, Instagram®, TikTok®, SnapChat®, Pinterest®, or Etsy®. Already printed or manufactured housing elements can be exchanged, traded, shared, or rented in an e-commerce platform that allows for users to rent, subscribe, and buy in a licensing model where goods are rented or used on a short-term basis and then returned as part of a subscription program.

In some examples, the structural configuration system is configured to, and can, use (and/or include) a generative artificial intelligence (AI) algorithm to customize of design(s) for the housing elements (e.g., as in operation 1010 and/or otherwise as discussed herein). A generative AI algorithm used by the structural configuration system can include an AI algorithm that is configured to, and can, generate content associated with the housing elements, interlocking elements, and/or tooling, such as text, images, videos, 3D models, textures for 3D models, 3D animations, renders, or combinations thereof. In some examples, generative AI algorithms include trained machine learning (ML) model(s) that are trained to generate such content as the output(s) of the trained ML model(s), for instance based on an input that includes a text prompt, an input image, an input audio clip, an input video clip, an input file, or some combination thereof. In an illustrative example, a generative AI system can use a generative AI algorithm to design and/or customize a housing element or set of housing elements (or corresponding interlocking component(s) and/or tooling) to have a particular shape attribute that is described in a prompt or illustrated in an input image, and/or to fit around portions of a particular structure that is described in a prompt or illustrated in an input image to house those portions of the structure.

In some examples, the structural configuration system is configured to, and can, use (and/or include) a trained machine learning (ML) model to customize of design(s) for the housing elements (e.g., as in operation 1010 and/or otherwise as discussed herein). An ML model used by the structural configuration system can include a system that is trained, based on training data, to generate an output in response to receipt of an input. In some cases, the training data includes examples of outputs that are pre-generated for associated inputs. Training the ML models using such training data can add and/or modify weights within the ML model (e.g., weights between neurons or nodes of a neural network), encouraging the trained ML model to generate similar outputs to those in the training data if given similar inputs to the corresponding inputs in the training data. In some cases, under a validation phase of training a trained ML model can continue to be updated (further trained) by providing the model with an input that has a corresponding pre-generated output, allowing the trained ML model to generate its own output based on the input, and then comparing the output generated by the trained ML model to the pre-generated output, for instance strengthening weights if the output generated by the trained ML model was close to the pre-generated output, or weakening or removing weights if the output generated by the trained ML model was far from the pre-generated output. In some cases, a trained ML model can continue to be updated (further trained) as the trained ML model is used, for instance by updating (further training) the trained ML model based on the output content that the trained ML model generated as well as feedback (e.g., from a user, from a reward function or model, or from another system) indicating whether the output content is a good output for the input or a bad output for the input.

For the structural configuration system, in some examples, the input to such a trained ML model can include, for instance, a text prompt describing a shape attribute (e.g., "curved," "angular," "blocky," "square," "rectangular," "polyhedral," "circular," "offset," "oblong," "symmetrical," "asymmetrical," "sleek," "rough," "modern," "country," "rustic," "antique," "Ionic," "Tuscan," "Doric," "Corinthian," "classic," "futuristic," "retro-futuristic," "post-modern," another shape attribute discussed herein, or a combination thereof) and/or an image illustrating an aspect of a shape attribute (e.g., illustrating an outline or curve to include in a housing element, interlocking component, and/or tooling), and the trained ML model can be trained to output a customized design for one or more housing element (s), interlocking component(s), and/or tooling that include the shape attribute described in the text prompt and/or illustrated in the input image. In some examples, the input to such a trained ML model can include, for instance, a text prompt describing the structure (and/or one or more portions thereof) and/or an image illustrating the structure (and/or one or more portions thereof), and the trained ML model can be trained to output a customized design for one or more housing element(s), interlocking component(s), and/or tooling that are customized with interior(s) that fit to and/or align with portions of the structure in order to house those portions of the structure. In some examples, the trained ML model can receive both types of inputs (e.g., inputs describing and/or illustrating shape attributes, as well as inputs describing and/or illustrating the structure), can output a customized design that is characterized by the shape attribute and that is also customized with interior(s) that fit to and/or align with portions of the structure in order to house those portions of the structure.

In some examples, the generative AI algorithm(s) and/or trained ML model(s) of the structural configuration system can include one or more neural network (NNs), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more conditional generative adversarial networks (cGANs), one or more other types of neural networks, one or more trained support vector machines (SVMs), one or more trained random forests (RFs), one or more computer vision systems, one or more deep learning systems, one or more classifiers, one or more transformers, one or more large language models (LLMs), or combinations thereof. For instance, the graphic representing the AI engine 940 in FIG. 9 illustrates a neural network.

In some examples, the structural configuration system is configured to, and can, use (and/or include) a large language model (LLM). A LLM used by the structural configuration system refers to language model including at least one ML model that is trained, using training content, to generate content associated with a housing element, interlocking component, and/or tooling. Training data for LLMs can include, for instance, large quantities of text data, which in some examples may be pre-processed. A content processing system can use an LLM for various tasks, such as predicting next word(s) in a text string based on existing words in the text string (e.g., given to the LLM as a prompt), summarizing content (e.g., the content given to the LLM as a prompt) to generate a summary of the content, analyzing content (e.g., the content given to the LLM as a prompt) to generate an analysis of the content, translating content (e.g., the content given to the LLM as a prompt) from one language to another, generating content requested in a prompt, or a combination thereof. For instance, to train an LLM trained to predict the next word in a text prompt based on training data that includes text data, the LLM can adjust its weights based on the difference between the LLM's prediction for the next word and the actual next word in the training data. This process can repeat numerous times until the LLM becomes sufficiently successful at word prediction. Depending on the task an LLM is configured to perform, the LLM can be trained further for a secondary task (e.g., summarizing content, analyzing content, translating content from one language to another, generating content requested in a prompt, or the like) in addition to being trained to predict a next word, allowing the LLM to use its trained ability to predicting words for other purposes. Examples of LLMs include Generative Pre-Trained Transformer (GPT) (e.g., GPT-2, GPT-3, GPT-3.5, GPT-4, or further iteration(s) of GPT) DaVinci, an LLM using LangChain (MIT), or a combination thereof.

For an LLM used by the structural configuration system, the secondary task that the LLM can be trained for can include generating text describing (e.g., providing instructions to build and/or use) customized design(s) (e.g., for a housing element, interlocking component, and/or tooling) that are customized based on a shape attribute and/or structure identified in corresponding input(s), generating image (s) illustrating customized design(s) (e.g., for a housing element, interlocking component, and/or tooling) that are customized based on a shape attribute and/or structure identified in corresponding input(s), generating 3D models for customized design(s) (e.g., for a housing element, interlocking component, and/or tooling) that are customized based on a shape attribute and/or structure identified in corresponding input(s), generating videos illustrating customized design(s) (e.g., for a housing element, interlocking component, and/or tooling) that are customized based on a shape attribute and/or structure identified in corresponding input(s), or a combination thereof.

In some examples, the structural configuration system can update and/or further train a generative AI system (e.g., a trained ML model and/or an LLM) based on feedback about an output generated by the generative AI. The feedback can include feedback received via a user interface (e.g., from a user), a score generated by a reward function or alignment function that scores the output based on alignment (or lack thereof) to expected attribute(s) of the output (e.g., whether a design is physically possible to manufacture, whether the design does in fact include the shape attribute, whether the design does in fact fit to the structure, and/or a level of complexity of the design), feedback from another subsystem that is set to then use the output (e.g., the CNC router 810 or another manufacturing device that can identify whether or not the output includes a valid design that can be manufactured given the constraints of the manufacturing device), or a combination thereof. The feedback can include positive feedback, in which case the structural configuration system can update and/or further train the generative AI system (e.g., ML model and/or LLM), for instance to strengthen weights associated with the output to encourage similar outputs given similar inputs. The feedback can include negative feedback, in which case the structural configuration system can update and/or further train the generative AI system (e.g., ML model and/or LLM), for instance to weaken and/or remove weights associated with the output to discourage similar outputs given similar inputs.

Figure 11:
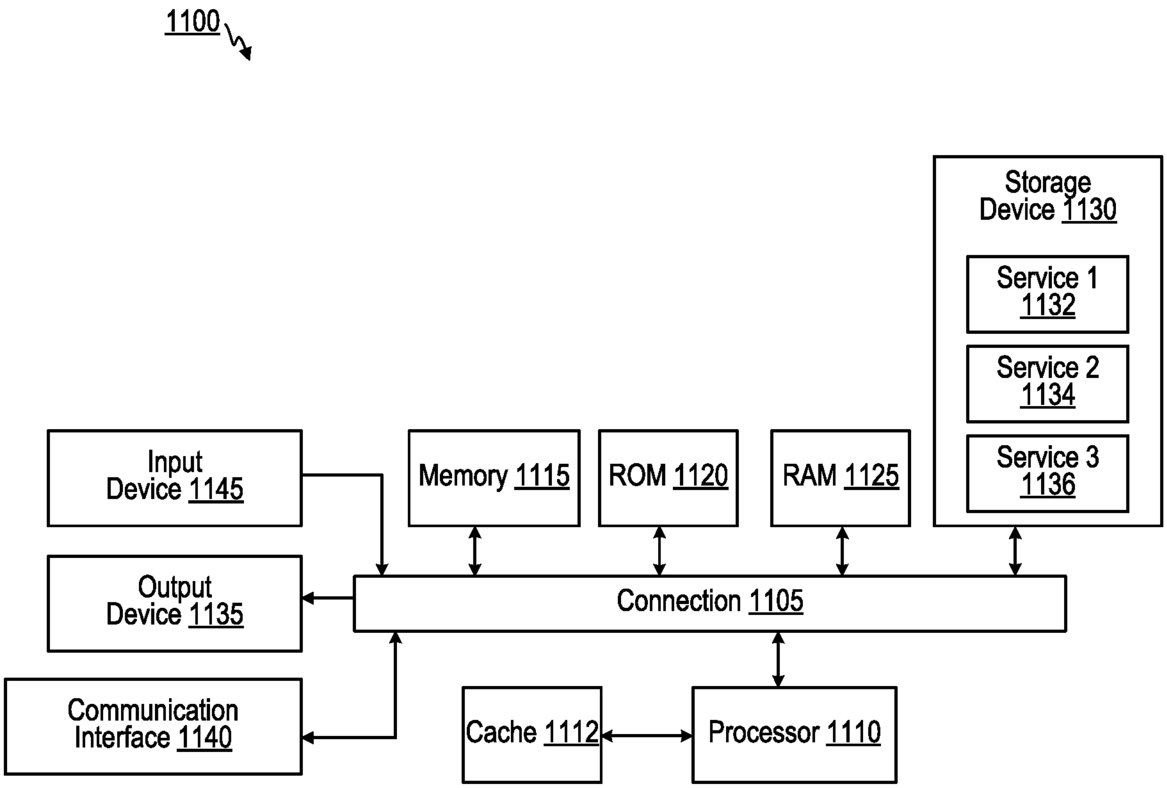
FIG. 11 is a block diagram of an exemplary computing device that may be used to implement some aspects of the technology.

FIG. 11 illustrates an exemplary computing system 1100 that may be used to implement some aspects of the technology. For example, any of the computing devices, computing systems, network devices, network systems, servers, and/or arrangements of circuitry described herein may include at least one computing system 1100, or may include at least one component of the computer system 1100 identified in FIG. 11. The computing system 1100 of FIG. 11 includes one or more processors 1110 and memory units 1120. Each of the processor(s) 1110 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 1110 may include one or more cores, either integrated onto a single chip or spread across multiple chips connected or coupled together. Memory 1120 stores, in part, instructions and data for execution by processor 1110. Memory 1120 can store the executable code when in operation. The system 1100 of FIG. 11 further includes a mass storage device 1130, portable storage medium drive(s) 1140, output devices 1150, user input devices 1160, a graphics display 1170, and peripheral devices 1180.

The components shown in FIG. 11 are depicted as being connected via a single bus 1190. However, the components may be connected through one or more data transport means. For example, processor unit 1110 and memory 1120 may be connected via a local microprocessor bus, and the mass storage device 1130, peripheral device(s) 1180, portable storage device 1140, and display system 1170 may be connected via one or more input/output (I/O) buses.

Mass storage device 1130, which may be implemented with a magnetic disk drive or an optical disk drive, is a non-volatile storage device for storing data and instructions for use by processor unit 1110. Mass storage device 1130 can store the system software for implementing some aspects of the subject technology for purposes of loading that software into memory 1120.

Portable storage device 1140 operates in conjunction with a portable non-volatile storage medium, such as a floppy disk, compact disk or Digital video disc, to input and output data and code to and from the computer system 1100 of FIG. 11. The system software for implementing aspects of the subject technology may be stored on such a portable medium and input to the computer system 1100 via the portable storage device 1140.

The memory 1120, mass storage device 1130, or portable storage 1140 may in some cases store sensitive information, such as transaction information, health information, or cryptographic keys, and may in some cases encrypt or decrypt such information with the aid of the processor 1110. The memory 1120, mass storage device 1130, or portable storage 1140 may in some cases store, at least in part, instructions, executable code, or other data for execution or processing by the processor 1110.

Output devices 1150 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 1170. The printer may be inkjet, laserjet, thermal, or some combination thereof. In some cases, the output device circuitry 1150 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. Output devices 1150 may include any ports, plugs, antennae, wired or wireless transmitters, wired or wireless transceivers, or any other components necessary for or usable to implement the communication types listed above, such as cellular Subscriber Identity Module (SIM) cards.

Input devices 1160 may include circuitry providing a portion of a user interface. Input devices 1160 may include an alpha-numeric keypad, such as a keyboard, for inputting alpha-numeric and other information, or a pointing device, such as a mouse, a trackball, stylus, or cursor direction keys. Input devices 1160 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a wired local area network (LAN) port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, personal area network (PAN) signal transfer, wide area network (WAN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. Input devices 1160 may include any ports, plugs, antennae, wired or wireless receivers, wired or wireless transceivers, or any other components necessary for or usable to implement the communication types listed above, such as cellular SIM cards.

Input devices 1160 may include receivers or transceivers used for positioning of the computing system 1100 as well. These may include any of the wired or wireless signal receivers or transceivers. For example, a location of the computing system 1100 can be determined based on signal strength of signals as received at the computing system 1100 from three cellular network towers, a process known as cellular triangulation. Fewer than three cellular network towers can also be used—even one can be used—though the location determined from such data will be less precise (e.g., somewhere within a particular circle for one tower, somewhere along a line or within a relatively small area for two towers) than via triangulation. More than three cellular network towers can also be used, further enhancing the location's accuracy. Similar positioning operations can be performed using proximity beacons, which might use short-range wireless signals such as BLUETOOTH® wireless signals, BLUETOOTH® low energy (BLE) wireless signals, IBEACON® wireless signals, personal area network (PAN) signals, microwave signals, radio wave signals, or other signals discussed above. Similar positioning operations can be performed using wired local area networks (LAN) or wireless local area networks (WLAN) where locations are known of one or more network devices in communication with the computing system 1100 such as a router, modem, switch, hub, bridge, gateway, or repeater. These may also include Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. Input devices 1160 may include receivers or transceivers corresponding to one or more of these GNSS systems.

Display system 1170 may include a liquid crystal display (LCD), a plasma display, an organic light-emitting diode (OLED) display, a low-temperature poly-silicon (LTPO) display, an electronic ink or "e-paper" display, a projector-based display, a holographic display, or another suitable display device. Display system 1170 receives textual and graphical information, and processes the information for output to the display device. The display system 1170 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 1180 may include any type of computer support device to add additional functionality to the computer system. For example, peripheral device(s) 1180 may include one or more additional output devices of any of the types discussed with respect to output device 1150, one or more additional input devices of any of the types discussed with respect to input device 1160, one or more additional display systems of any of the types discussed with respect to display system 1170, one or more memories or mass storage devices or portable storage devices of any of the types discussed with respect to memory 1120 or mass storage 1130 or portable storage 1140, a modem, a router, an antenna, a wired or wireless transceiver, a printer, a bar code scanner, a quick-response ("QR") code scanner, a magnetic stripe card reader, a integrated circuit chip (ICC) card reader such as a smartcard reader or a EUROPAY®-MASTERCARD®-VISA® (EMV) chip card reader, a near field communication (NFC) reader, a document/image scanner, a visible light camera, a thermal/infrared camera, an ultraviolet-sensitive camera, a night vision camera, a light sensor, a phototransistor, a photoresistor, a thermometer, a thermistor, a battery, a power source, a proximity sensor, a laser rangefinder, a sonar transceiver, a radar transceiver, a lidar transceiver, a network device, a motor, an actuator, a pump, a conveyer belt, a robotic arm, a rotor, a drill, a chemical assay device, or some combination thereof.

The components contained in the computer system 1100 of FIG. 11 can include those typically found in computer systems that may be suitable for use with some aspects of the subject technology and represent a broad category of such computer components that are well known in the art. That said, the computer system 1100 of FIG. 11 can be customized and specialized for the purposes discussed herein and to carry out the various operations discussed herein, with specialized hardware components, specialized arrangements of hardware components, and/or specialized software. Thus, the computer system 1100 of FIG. 11 can be a personal computer, a hand held computing device, a telephone ("smartphone" or otherwise), a mobile computing device, a workstation, a server (on a server rack or otherwise), a minicomputer, a mainframe computer, a tablet computing device, a wearable device (such as a watch, a ring, a pair of glasses, or another type of jewelry or clothing or accessory), a video game console (portable or otherwise), an e-book reader, a media player device (portable or otherwise), a vehicle-based computer, another type of computing device, or some combination thereof. The computer system 1100 may in some cases be a virtual computer system executed by another computer system. The computer can also include different bus configurations, networked platforms, multi-processor platforms, etc. Various operating systems can be used including Unix®, Linux®, FreeBSD®, FreeNAS®, pfSense®, Windows®, Apple® Macintosh OS® ("MacOS®"), Palm OS®, Google® Android®, Google® Chrome OS®, Chromium® OS®, OPENSTEP®, XNU®, Darwin®, Apple® iOS®, Apple® tvOS®, Apple® watchOS®, Apple® audioOS®, Amazon® Fire OS®, Amazon® Kindle OS®, variants of any of these, other suitable operating systems, or combinations thereof. The computer system 1100 may also use a Basic Input/Output System (BIOS) or Unified Extensible Firmware Interface (UEFI) as a layer upon which the operating system(s) are run.

In some cases, the computer system 1100 may be part of a multi-computer system that uses multiple computer systems 1100, each for one or more specific tasks or purposes. For example, the multi-computer system may include multiple computer systems 1100 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 1100 from different networks communicatively coupled together via the internet (also known as a "distributed" system).

Some aspects of the subject technology may be implemented in an application that may be operable using a variety of devices. Non-transitory computer-readable storage media refer to any medium or media that participate in providing instructions to a central processing unit (CPU) for execution and that may be used in the memory 1120, the mass storage 1130, the portable storage 1140, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L15), resistive random-access memory (RRAIVI/ReRAM), phase change memory (PCM), spin transfer torque RAM (STT-RAM), another memory chip or cartridge, or a combination thereof.

Various forms of transmission media may be involved in carrying one or more sequences of one or more instructions to a processor 1110 for execution. A bus 1190 carries the data to system RAM or another memory 1120, from which a processor 1110 retrieves and executes the instructions. The instructions received by system RAM or another memory 1120 can optionally be stored on a fixed disk (mass storage device 1130/portable storage 1140) either before or after execution by processor 1110. Various forms of storage may likewise be implemented as well as the necessary network interfaces and network topologies to implement the same.

While various flow diagrams provided and described above may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system 1100 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claims.

The invention claimed is:

1. A system for interchangeable structural configuration, the system comprising:

a plurality of housing elements with respective exteriors that share at least one shape attribute, wherein each of the plurality of housing elements detachably houses a respective portion of a structure to apply the at least one shape attribute to the respective portion of the structure of a plurality of portions of the structure, wherein the plurality of housing elements includes a plurality of interlocking components that secure the plurality of housing elements about the structure; and a plurality of fasteners arranged along the plurality of interlocking components, the plurality of fasteners detachably securing the plurality of interlocking components, wherein the plurality of fasteners includes a cuff having a pair of resilient arms biased toward each other according to a tension force.

2. The system of claim 1, wherein a housing element of the plurality of housing elements includes a concave interior surface that wraps around a convex surface of a portion of the structure of the plurality of portions of the structure.

3. The system of claim 1, wherein a housing element of the plurality of housing elements includes an interior surface formed using the plurality of interlocking components, wherein the interior surface defines an opening to receive a corresponding portion of the structure of the plurality of portions of the structure.

4. The system of claim 1, wherein a portion of the structure of the plurality of portions of the structure includes at least one rod, wherein a corresponding housing element of the plurality of housing elements detachably houses the at least one rod to apply the at least one shape attribute to the at least one rod.

5. The system of claim 1, wherein a portion of the structure of the plurality of portions of the structure includes an intersection of a plurality of rods, wherein a corresponding housing element of the plurality of housing elements detachably houses the intersection to apply the at least one shape attribute to the intersection.

6. The system of claim 1, wherein a portion of the structure of the plurality of portions of the structure includes a joint that couples a first member of the structure to a second member of the structure, wherein the first member of the structure is movable about the joint relative to the second member of the structure within a range of movement, wherein a corresponding housing element of the plurality of housing elements detachably houses the joint to apply the at least one shape attribute to the joint, wherein the corresponding housing element preserves the range of movement associated with the joint.

7. The system of claim 1, wherein the plurality of housing elements includes at least one rigid material having a surface shaped according to a portion of the structure of the plurality of portions of the structure.

8. The system of claim 1, wherein the plurality of housing elements includes at least one flexible material having a surface that flexes around a portion of the structure of the plurality of portions of the structure.

9. The system of claim 1, wherein the plurality of fasteners includes at least one fastener that detachably secures at least one of the plurality of interlocking components to the structure.

10. The system of claim 1, wherein the plurality of fasteners includes at least one fastener that detachably secures a first interlocking component to a second interlocking component, wherein the plurality of interlocking components includes at least the first interlocking component and the second interlocking component.

11. The system of claim 1, wherein the plurality of interlocking components includes two interlocking components, and wherein the two interlocking components interlock to wrap around an entirety of a circumference of a corresponding portion of the structure of the plurality of portions of the structure.

12. The system of claim 1, wherein the plurality of interlocking components includes at least one hole, and wherein at least one of the plurality of fasteners includes at least one protrusion that interfaces with the at least one hole to detachably secure the plurality of interlocking components.

13. The system of claim 1, wherein at least one of the plurality of fasteners includes at least one magnet that interfaces with at least one of a second magnet or a ferromagnetic material to detachably secure the plurality of interlocking components.

14. The system of claim 1, wherein at least one of the plurality of fasteners includes at least one of a latch or a clamp that transitions from an open state to a closed state to detachably secure the plurality of interlocking components.

15. The system of claim 1, wherein the plurality of interlocking components include at least one 3D printed component, the at least one 3D printed component includes at least one of a metal, a plastic, a thermoplastic, or a resin.

16. The system of claim 1, wherein the plurality of interlocking components are manufactured using at least one of a 3D printer, a CNC router, a cast iron foundry, welding, hand forging, hand carving, injection molding, sand casting, die casting, a water jet cutter, or a laser cutter.

17. The system of claim 1, wherein the at least one shape attribute includes at least one of a shape, a contour, an outline, a mesh, a curve, an edge, a corner, a style, or a type.

18. The system of claim 1, further comprising:

a memory; and a processor that executes instructions stored in the memory, the processor to:

identify the structure; and customize respective interiors of the plurality of housing elements based on the structure, wherein the respective interiors fit around the respective exteriors of respective portions of the plurality of portions of the structure.

* * * * *